United States Patent
Wiechers

(10) Patent No.: US 12,105,067 B2
(45) Date of Patent: Oct. 1, 2024

(54) DROPLET GENERATOR SYSTEM, DETECTOR FOR SAMPLES, CORRESPONDING METHOD AND USE

(71) Applicant: DIONEX SOFTRON GMBH, Germering (DE)

(72) Inventor: Joachim Wiechers, Planegg (DE)

(73) Assignee: Dionex Softron GmbH, Germering (DE)

( * ) Notice: Subject to any disclaimer, the term of this patent is extended or adjusted under 35 U.S.C. 154(b) by 675 days.

(21) Appl. No.: 16/694,995

(22) Filed: Nov. 25, 2019

(65) Prior Publication Data

US 2020/0166490 A1    May 28, 2020

(30) Foreign Application Priority Data

Nov. 26, 2018   (DE) .......................... 102018129812.9

(51) Int. Cl.
*G01N 30/84* (2006.01)
*G01N 30/64* (2006.01)
*G01N 15/00* (2006.01)
*G01N 30/02* (2006.01)

(52) U.S. Cl.
CPC ............. *G01N 30/84* (2013.01); *G01N 30/64* (2013.01); *G01N 2015/0003* (2013.01); *G01N 2030/027* (2013.01); *G01N 2030/8452* (2013.01)

(58) Field of Classification Search
CPC ............................................. G01N 2015/0003
See application file for complete search history.

(56) References Cited

U.S. PATENT DOCUMENTS

| 4,794,086 A | * | 12/1988 | Kasper ................... G01N 33/18 356/336 |
| 5,345,079 A | | 9/1994 | French et al. |
| 6,116,516 A | | 9/2000 | Ganan-Calvo |
| 6,119,953 A | | 9/2000 | Ganan-Calvo et al. |
| 6,174,469 B1 | | 1/2001 | Ganan-Calvo |
| 6,187,214 B1 | | 2/2001 | Ganan-Calvo |
| 6,189,803 B1 | | 2/2001 | Ganan-Calvo |
| 6,196,525 B1 | | 3/2001 | Ganan-Calvo |
| 6,197,835 B1 | | 3/2001 | Ganan-Calvo |
| 6,234,402 B1 | | 5/2001 | Ganan-Calvo |
| 6,241,159 B1 | | 6/2001 | Ganan-Calvo et al. |

(Continued)

FOREIGN PATENT DOCUMENTS

| CN | 103547455 | * | 1/2014 |
| DE | 102014207657 B3 | | 7/2015 |
| JP | H06102245 | * | 4/1994 |

OTHER PUBLICATIONS

Duan, H. et al., "A New Monodisperse Droplet Generator and its Applications", ILASS Americas 28th Annual Conference in Liquid Atomization and Spray Systems, Dearborn, MI, May 2016.

(Continued)

*Primary Examiner* — Jamel E Williams
*Assistant Examiner* — Alex T Devito

(57) ABSTRACT

A detector system includes a droplet generator system, wherein the droplet generator system includes a droplet generator unit. The droplet generator unit is configured to create droplets from a liquid supplied to the droplet generator unit with a droplet generator liquid flow. The droplet generator unit is configured to create the droplets with a defined droplet generation frequency.

10 Claims, 3 Drawing Sheets

(56) References Cited

U.S. PATENT DOCUMENTS

| | | |
|---|---|---|
| 6,248,378 B1 | 6/2001 | Ganan-Calvo |
| 6,299,145 B1 | 10/2001 | Ganan-Calvo |
| 6,357,670 B2 | 3/2002 | Ganan-Calvo |
| 6,386,463 B1 | 5/2002 | Ganan-Calvo |
| 6,394,429 B2 | 5/2002 | Ganan-Calvo |
| 6,405,936 B1 | 6/2002 | Ganan-Calvo |
| 6,432,148 B1 | 8/2002 | Ganan-Calvo |
| 6,450,189 B1 | 9/2002 | Ganan-Calvo |
| 6,464,886 B2 | 10/2002 | Ganan-Calvo |
| 6,554,202 B2 | 4/2003 | Ganan-Calvo |
| 6,557,834 B2 | 5/2003 | Ganan-Calvo |
| 2009/0035770 A1* | 2/2009 | Mathies ............ G01N 27/44743 204/453 |
| 2009/0217742 A1* | 9/2009 | Chiu ................. B01L 3/502753 250/288 |
| 2010/0285975 A1* | 11/2010 | Mathies .............. B01F 33/3011 506/7 |
| 2011/0000560 A1* | 1/2011 | Miller ...................... G01N 1/38 137/561 R |
| 2011/0204220 A1 | 8/2011 | Van et al. |
| 2015/0314317 A1 | 11/2015 | Duan et al. |

OTHER PUBLICATIONS

Flow Focusing Incorporated, http://www.flowfocusing.com/, 8 pages.
"Flow-Focusing Monodisperse Aerosol Generator (FMAG)", Model 1520, MSP—A Division of TSI, Published in 2018.
Ganan-Calvo, A. M, "Generation of Steady Liquid Microthreads and Micron-Sized Monodisperse Sprays in Gas Streams", Physical Review Letters, vol. 80, No. 2, Jan. 12, 1998, pp. 285-288.
Leclaire, T: "Entwicklung eines Verfahrens zur Erzeugung monodisperser Partikel mit definierter elektrischer Ladung", Dissertation zur Erlangung des Grades eines Doktoringenieurs (online), Tag der mundlichen Prufung: Mar. 23, 2005. S. I-V u. 1-18.
Monodisperse Generators, https://www.tsi.com/products/aerosol-generators-dispersers/monodisperse-generators/, 3 pages.
Ganan-Calvo, A, M., "Perfectly Monodisperse Micro-Bubble Production by Novel Mechanical Means" Presented at American Physical Society 53rd Annual Meeting of the Division of Fluid Dynamics on Nov. 19-21, 2000, Washington DC, Publication Date Nov. 2000.
Gordillo et al. "Spatial Instability Analysis of a Gas-Liquid Shear Layer" Session BG, Shear Layer Instability, Oral Session at American Physical Society 53rd Annual Meeting of the Division of Fluid Dynamics, Washington DC, Hyatt Regency Capitol Hill, Nov. 19, 2000. Abstract only.
Kowalewski, T.A. "On the Separation of Droplets from a Liquid Jet," Fluid Dynamics Research, vol. 17, No. 3, pp. 121-145.
First CN Office Action mailed on Mar. 2, 2022, to CN Patent Application No. 201911155134.X.

* cited by examiner

DROPLET GENERATOR SYSTEM, DETECTOR FOR SAMPLES, CORRESPONDING METHOD AND USE

CROSS-REFERENCE TO RELATED APPLICATION

This application claims the priority benefit under 35 U.S.C. § 119 to German Patent Application No. DE 10 2018 129 812.9, filed on Nov. 26, 2018, the disclosure of which is incorporated herein by reference.

FIELD OF INVENTION

This invention generally relates to sample detection using a droplet generator system.

BACKGROUND

HPLC systems may employ a diverse type of detection methods, according to the characteristics of the analyte or the system of interest. For instance, some widespread detection methods are: evaporative light scattering detection (ELSD), which may be suitable for gradient and isocratic elution; refractive index (RI), which may be used to detect an analyte based upon the refractive index variation of the mobile phase; mass spectroscopy-based methods (MS) and ultraviolet/visible light spectroscopy-based methods (UV-Vis). However, ELSD, MS and UV/Vis may be affected by physical and/or chemical properties of samples.

Another method is charged aerosol detection (CAD). CAD is a detection method able of quantifying a given chemical (or a plurality of chemicals) in a sample upon creating charged aerosol particles, which are analyzed using an amperemeter. CAD methods are commonly used to quantitate non-volatile and semi-volatile analytes, and can provide consistent analyte response independent of chemical structures and molecule sizes.

For example, U.S. Pat. No. 6,568,245 B2 discloses an aerosol detector, particularly for liquid chromatography applications, which includes a corona discharge source controlled to selectively charge the non-volatile residue particles of an aerosol. The aerosol initially is composed of droplets of a liquid sample, with the residue particles resulting from droplet evaporation. The selectively charged residue particles are collected at a conductive filter. The electrical current along a conductor coupled to the filter is measured repeatedly or continuously to provide an indication of concentrations of the non-volatile material.

In simple words, CAD methods are independent of the presence of, for example, a chromophore and the ionization ability of a molecule. Therefore, the charged aerosol detection is capable of delivering accurate and precise quantification of, but not limited to, lipids, carbohydrates, antibiotics, natural products, surfactants, biofuels, excipients, amines and counter-ions, that other detection methods, e.g. UV/Vis absorbance, cannot detect. Moreover, charged aerosol detection methods may provide uniform response to measurements of analytes with chromophores, and in particular, independently of their extinction coefficient at a particular wavelength. CAD methods may also provide good quantitative estimates of unknown impurities, including degradation products. Thus, charged aerosol detection methods are considered advantageous with regard to other detection methods, e.g. ELSD, in terms of sensitivity, dynamic range and response uniformity.

US 2014 0352411 A1 discloses a nebulizer for a CAD system. The nebulizer is provided with a spray emitter for generating a spray of droplets within a central region of a spray chamber. The central region is separated from an upper region by a horizontally projecting rib, which defines a passageway between the central and upper regions. The major direction of droplet travel within the upper region is substantially reversed with respect to the major direction of droplet travel within the central region. Larger droplets are unable to negotiate the turn from the central to upper regions and impinge on a rear surface of the spray chamber.

Even though such CADs have proved to be compatible with gradient conditions of HPLC, UHPLC and micro LC, and several charged aerosol detection systems have given consistently good results, there still remain some unresolved issues for providing more reliable quantitative measurements.

Generally, one problem of CADs is their dependency on the solvent that is used. Different solvents (e.g., water and methanol) may yield different results as regards the resulting charge or current that is measured, which may render the subsequent analysis difficult.

SUMMARY

In light of the above, it is therefore an object of the present invention to overcome or at least to alleviated the shortcomings and disadvantages of the prior art. More particularly, it is an object of the present invention to provide an analytical method and system having improved characteristic as regards independence from the solvent used. While embodiments of the present invention will particularly be described with reference to the CAD technology, it should be understood that the present invention is not limited to CAD, but can in fact also be employed with other detection technologies, such as, mass spectrometry.

The invention lies in the field of sample detection. While the invention will be described with primary reference to charged aerosol detection (CAD), it should be understood that the invention is not limited to this field, but can also be employed in other detection methods, such as, mass spectrometry. The invention is applicable to the field of chromatography, such as liquid chromatography (LC) and particularly to the field of analyte detection for High Performance Liquid Chromatography (HPLC) and Ultra-High Performance Liquid Chromatography (UHPLC). LC is a method of separating samples into their constituent parts. The constituent parts can be separated for subsequent use or their portions can be detected and quantified.

In a first aspect, the present invention relates to a droplet generator system, wherein the system comprises a droplet generator unit.

The droplet generator unit may be configured to create droplets from a liquid supplied to the droplet generator unit with droplet generator liquid flow. It should be understood that the term droplet generator liquid flow is used herein to describe the flow of liquid arriving at the droplet generator unit.

The droplet generator unit may be configured to create the droplets with a droplet generation defined frequency.

This may be different to the pneumatic nebulizers most commonly used in the prior art. With such pneumatic nebulizers (as in the prior art), it may not be possible to create the droplets with a defined frequency. The respective embodiment of the present technology may thus be beneficial, as it may generate the droplets in a more controlled and reproducible manner.

The droplet generator unit may be configured to generate disturbances and to transmit the disturbances to the droplet generator liquid flow, wherein the droplet generation frequency may correspond to a frequency of the disturbances.

The droplet generation frequency may be adjustable. In other words, the frequency of the disturbances may be adjustable.

Thus, the droplet generation frequency may be set to suitable values. In particular, it may thus be possible to adjust the droplet generation frequency in dependence of a liquid flow towards the droplet generator unit. Consider, e.g., the situation that first, a liquid flow of 30 µl/min arrives at the droplet generator unit, and second, a liquid flow of 60 µl/min arrives at the droplet generator unit. When setting the droplet generation frequency in the second situation to double the setting of the droplet generation frequency in the first situation, the number of signals per volume remains constant. Thus, it may be possible to generate droplets with a size (or a size distribution) which is relatively independent from the flow arriving at the droplet generator unit.

This may be beneficial for the following reason: In charged aerosol detectors, a diffusion charging process is typically used to charge particles (which are generated by drying the droplets). This diffusion charging mechanism results in a charge of the particles which is proportional to the particle diameter. Thus, particles which have the 8-fold quantity of analyte have only twice the charge. Thus, when droplets (and thus particles) of varying size are generated for different flows towards the droplet generator unit, the final measurement signal is not directly proportional to the quantity of analyte.

This may be overcome by having an adjustable droplet generation frequency, as thus, the frequency for droplet generation may be set, e.g., in such a way that the resulting size distribution of the droplets is relatively independent from the flow towards the droplet generation unit. This may be one measure to reduce and/or eliminate the above-described non-linearity.

The droplet generator unit may comprise an orifice, and the droplet generator unit may be configured to generate a liquid jet by the droplet generator liquid flow being guided through the orifice.

The orifice may have an orifice diameter, preferably in the range of 1 μm to 50 μm, further preferably 3 μm to 40 μm, such as 5 μm to 20 μm.

The droplet generator unit may further comprise a droplet flow region into which the droplets are introduced, wherein the droplet flow region comprises a diameter 30 to 10,000 times larger than the orifice diameter, preferably 50 to 2,000 times, such as 100 to 1,000 times.

The droplet generator system may further comprise a controller for controlling the droplet generator unit.

The controller may be configured to control the droplet generation frequency.

The controller may be configured to control the droplet generation frequency in dependence of the droplet generator liquid flow.

This may have the benefits as described above and may in particular render the sizes of the generated droplets (and particles) relatively independent of the droplet generator liquid flow.

Furthermore, by suitable setting the droplet generation frequency in dependence of the droplet generator liquid flow towards the droplet generator unit, it may also be possible to generate the droplets with a size (or size distribution) which is relatively independent of the solvent used. This may render the present technology relatively independent from the actual solvent used.

The controller may be configured to control the droplet generation frequency proportionally to the droplet generator liquid flow.

For each droplet generator liquid flow in a droplet generator flow range having a lower limit and an upper limit, the upper limit being at least 2 times the lower limit, the controller may be configured to control the droplet generation frequency to be within a range defined by $0.5 \cdot v$ and $1.5 \cdot v$, preferably in a range defined by $0.8 \cdot v$ and $1.2 \cdot v$, such as within a range of $0.9 \cdot v$ and $1.1 \cdot v$, wherein $v = 0.28 \cdot F/D^3$, wherein D is the orifice diameter and F is the droplet generator liquid flow to the droplet generator.

That is, the system may be configured to set the droplet generation frequency to a frequency of approximately $v = 0.28 \cdot F/D^3$. In a liquid jet generated by a flow through an orifice, this frequency will be the frequency corresponding to disturbances having a wavelength of $\lambda = 9.02 \cdot r$, where r is the radius (corresponding to half the diameter D). This frequency typically is close to the frequency of the most rapidly growing disturbance. That is, when supplying this frequency to the system, droplets will usually be formed with this frequency. In this regard, it is noted that the exact configuration of the naturally most rapidly growing disturbance actually depends on the exact solvent used (but has a wavelength close to the above described wavelength). However, when supplying the system with the above described frequency, droplets will form with this frequency, independent of what would actually be the naturally most rapidly growing disturbance. Thus, by setting the frequency to the above described values, it is possible to aptly control the frequency with which droplets are generated.

The system may be configured to be used in a detector system, such as a charged aerosol detector system. However, it should be understood that the present invention is not limited to charged aerosol system. Instead, e.g., the system may also be configured to be used in a mass spectrometry system.

The droplet generator unit may be configured to generate droplets with a diameter distribution, such that in a graph depicting liquid volume as a function of the diameter of the droplets, the full width at half maximum (FWHM) is below $0.4 \cdot \overline{D}$, preferably below $0.3 \cdot \overline{D}$, further preferably below $0.2 \cdot \overline{D}$, such as below $0.1 \cdot \overline{D}$, where D is the volume based average droplet diameter.

That is, the system may result in a relatively narrow diameter distribution.

The droplet generator unit may be a piezoelectric droplet generator unit.

The droplet generator unit may comprise a piezoelectric ceramic.

The piezoelectric ceramic may be configured for emitting mechanical waves.

The droplet generator unit may comprise a voltage generator.

The droplet generator unit may comprise an amplifier located between the generator and the piezoelectric ceramic.

The droplet generator unit may further comprise a gas conduit, wherein the gas conduit is configured for supplying the droplet generator unit with an gas stream with a flow rate between 0.1 and 10 L/min, preferably between 1 and 7 L/min, more preferably between 2 and 5 L/min.

The droplet generator unit may further comprise a housing, wherein the housing comprises the orifice.

The housing may be replaceable.

The piezoelectric ceramic may surround the housing.

The droplet generator unit may further comprise a droplet flow region.

The system may be configured to establish a flow velocity in the range of 1 m/s to 20 m/s in the droplet flow region, preferably 5 m/s to 10 m/s, such as 7 m/s to 9 m/s.

The droplet generator unit may be configured to generate droplets with a volume based average diameter in the range of 10 μm to 50 μm, preferably 15 μm to 25 μm.

The voltage generator may be an alternating current voltage generator.

The voltage generator may be configured to operate in a frequency range of 50 to 500 kHz, and preferably 100 to 300 kHz.

The system may comprise a flow control unit upstream of the droplet generator unit.

It will be understood that the flow control unit may control a flow towards the droplet generator unit. Thus, only a flow in a pre-determined range may arrive at the droplet generator unit. This may also simplify the subsequent steps, e.g., setting the droplet generation frequency in dependence of the flow arriving at the droplet generation unit.

Furthermore, by having a defined and limited flow at the droplet generation unit, it may also be simpler to dry the droplet in a further downstream drying section, as only a defined and limited amount of volume has to be evaporated in a defined amount of time.

For each incoming liquid flow in an incoming flow range, the flow control unit may configured to direct the droplet generator liquid flow in an outgoing flow range towards the droplet generator unit,

- wherein the incoming flow range has an incoming lower limit and an incoming upper limit, wherein the incoming upper limit is at least 10 times the incoming lower limit, preferably at least 30 times the incoming lower limit, such as at least 100 times the incoming lower limit,
- wherein the outgoing flow range has an outgoing lower limit and an outgoing upper limit, wherein the outgoing upper limit is at most 5 times the outgoing lower limit, preferably at most 4 times the outgoing lower limit, further preferably at most 3 times the outgoing lower limit, such as at most 2.5 times the outgoing lower limit.

That is, independent on the incoming flow at the flow control unit, the flow towards the droplet generation unit may always be in a range, where the upper limit is at most only 5 times the lower limit (and preferably, where the upper limit is at most only 2.5 times the lower limit). Again, thus, a flow in a defined and limited flow range may arrive at the droplet generation unit.

For each incoming flow in the range of 25 μl/min to 2500 μl/min, the flow control unit may be configured to direct the droplet generator liquid flow in the range of 10 μl/min to 100 μl/min to the droplet generator unit.

The flow control unit may comprise a splitter element.

The splitter element may be configured and located to split the incoming liquid flow into an outgoing flow path towards the droplet generator unit and into an additional flow path.

The flow control unit may further comprise a flow resistive element in the outgoing flow path.

The flow control unit may further comprise an extra volume element in the outgoing flow path.

The extra volume element may add a volume to the outgoing flow path corresponding to the volume of one or more additional functional elements in the additional flow path (e.g., it may have a volume corresponding to the volume of a flow selection valve in the additional flow path).

The flow control unit may be configured to set a flow resistance in the additional flow path to different values.

The additional flow path may comprise a primary flow path, a plurality of secondary flow paths, and a flow selection valve configured to establish a connection between the primary flow path and each of the plurality of second flow paths, respectively.

The secondary flow paths may comprise a set of secondary flow paths, wherein each secondary flow path of this set comprises a secondary flow resistive element, respectively.

The secondary flow resistive elements may be different from one another.

A delay time in the flow resistive element in the outgoing flow path may be substantially identical to a delay time in each of the secondary flow resistive elements.

A volume of the extra volume element may correspond to a volume of the flow selection valve.

The secondary flow paths may comprise a dead end flow path.

The flow control unit may further comprise a waste.

The waste may be located downstream of the additional flow path.

The system may be configured to generate water droplets from water, methanol droplets from methanol, and acetonitrile droplets from acetonitrile, wherein the water droplets have a volume based average water droplet size, the methanol droplets have a volume based average methanol droplet size, and the acetonitrile droplets have a volume based average acetonitrile droplet size, wherein the average methanol droplet size and the average acetonitrile droplet size are within a range defined by 0.5× the average water droplet size and 1.5× the average water droplet size, preferably in a range defined by 0.8× the average water droplet size and 1.2× the average water droplet size, such as in a range defined by 0.9× the average water droplet size and 1.1× the average water droplet size.

Thus, the droplets can be created having a size being relatively independent from the solvent used.

The present invention also relates to a detector system comprising the droplet generator system discussed above.

The detector system may further comprise an evaporation section configured for solvent evaporation.

The detector system may further comprise a mixing chamber configured for interaction of particles generated by drying the droplets with a stream of charged ions.

The mixing chamber may be connected to an ion charger configured for electrically charging a gas stream.

The detector system may further comprise an ion trap configured for eliminating ions with a high electric mobility.

The detector system may further comprise an ampere meter configured for measuring a charge of particles.

The detector system may further comprise a transducer configured for converting the measured charge into human-readable signal.

The human-readable signal may be a chromatographic spectrum.

The detector system may not comprise an impactor downstream of the droplet generator system.

That is, the present technology allows the impactor downstream of the droplet generator system to be omitted. This may be beneficial for the following reason: When using an impactor, relatively large droplets may be separated from the other droplets. However, the liquid contained in such large droplets may accumulate, and a certain extent of re-nebulization from the drainage sump may occur if a nebulizer chamber with drainage is used. This may cause additional signals from re-nebulization, which compete with signals of other substances (which elute shortly after the first substance) and thus limit the dynamics for signals located at a close temporal distance. This disadvantage may be overcome by omitting the impactor.

The detector system may comprise a discharge assembly located downstream of the droplet generator unit and upstream of the evaporation section.

For example, the detector system may be a charged aerosol detector system or a mass spectrometry detector system.

The present invention also relates to an analytical method, the method comprising using the droplet generator system discusses above or the detector system discussed above.

The method may further comprise the droplet generator unit creating droplets from a droplet generator liquid flow to the droplet generator unit.

The method may further comprise the droplet generator unit creating the droplets with a defined droplet generation frequency.

The method may further comprise the droplet generator unit generating disturbances and transmitting the disturbances to the droplet generator liquid flow, wherein the droplet generation frequency may correspond to a frequency of the disturbances.

The method may further comprise adjusting the droplet generation frequency.

The method may further comprise the droplet generator unit generating a liquid jet by the droplet generator liquid flow being guided through the orifice.

The method may further comprise the controller controlling the droplet generator unit.

The method may further comprise the controller controlling the droplet generation frequency.

The method may further comprise the controller controlling the droplet generation frequency in dependence of the droplet generator liquid flow.

The method may further comprise the controller controlling the droplet generation frequency proportionally to the droplet generator liquid flow.

The method may further comprise the controller controlling the droplet generation frequency to be within a range defined by $0.5 \cdot v$ and $1.5 \cdot v$, preferably in a range defined by $0.8 \cdot v$ and $1.2 \cdot v$, such as within a range of $0.9 \cdot v$ and $1.1 \cdot v$, wherein $v = 0.28 \cdot F/D^3$, wherein D is the orifice diameter and F is the droplet generator liquid flow to the droplet generator.

The method may comprise the droplet generator unit generating droplets with a diameter distribution, such that in a graph depicting liquid volume as a function of the diameter of the droplets, the full width at half maximum (FWHM) is below $0.4 \cdot \overline{D}$, preferably below $0.3 \cdot \overline{D}$, further preferably below $0.2 \cdot \overline{D}$, such as below $0.1 \cdot \overline{D}$, where D is the volume based average droplet diameter.

The method may comprise generating droplets with a volume based average diameter in the range of 10 μm to 50 μm, preferably 15 μm to 25 μm.

The method may comprise
the flow control unit receiving a first incoming liquid flow and feeding a first outgoing liquid flow of the first incoming liquid flow towards the droplet generator unit;
the flow control unit receiving a second incoming liquid flow and feeding a second outgoing liquid flow of the second incoming liquid flow towards the droplet generator unit;
wherein the ratio between the first incoming liquid flow and the second incoming liquid flow is greater than 10, and wherein the ratio between the first outgoing liquid flow and the second outgoing liquid flow is smaller than 5.

The method may comprise the flow control unit receiving an incoming liquid flow exceeding 500 μl/min, preferably exceeding 1,000 μl/min, further preferably exceeding 2,000 μl/min, and the flow control unit feeding an outgoing liquid flow of the incoming liquid flow towards the droplet generator unit, wherein the outgoing liquid flow is below 300 μl/min, preferably below 200 μl/min, such as below 100 μl/min.

The present invention also relates to a use of the droplet generator system discussed above, or a detector system discussed above for a method as discussed above.

The use may be in chromatography.

The use may be in liquid chromatography.

The use may be in high performance liquid chromatography.

The use may be in ultra-high performance liquid chromatography.

It will be understood that the described method and the described use may have the advantages described above in connection to the systems.

That is, generally, the presently described technology may particularly generate droplets with a relatively constant size (or size distribution), and the droplet size may be relatively independent from the liquid flow and the solvent used. That is, the present invention may provide a technology which eliminates both solvent dependence and non-linearity.

This may be beneficial, as the same amount of analyte will thus give rise to the same signal, independent of the solvent used. This may render the subsequent analysis particularly simple.

In other words, in embodiments of the present technology, the flow rate towards the droplet generator unit and the drop size or drop size distribution of the generated drops is relatively constant (and independent of the solvent used). This eliminates, on the one hand, the solvent dependency, and, on the other hand, enables elimination of the non-linearity via calculation. Moreover, embodiments of the present technology employ a drop generator by means of which drops of one size (or a relatively narrow size distribution) can be generated in a manner independent on the elution agent.

Further, this may also render the presently described technology particularly suitable for the use with gradients. For example, chromatography often uses gradients. This means that the composition of the elution agent changes during one chromatogram. This may also be problematic if the size of the droplets generated and thus the signal per analyte depends on the solvent used. As these problems are overcome by the present technology, the present technology may be particularly suitable when such gradients are used.

The present technology is also defined by the following numbered embodiments.

Below, embodiments relating to a droplet generator system will be discussed. These embodiments are abbreviated by the letter "S" followed by a number. When reference is herein made to a DG embodiment, those embodiments are meant.

S1. A droplet generator system, wherein the system comprises a droplet generator unit.

S2. The droplet generator system according to the preceding embodiment, wherein the droplet generator unit is configured to create droplets from a liquid supplied to the droplet generator unit with a droplet generator liquid flow.

S3. The droplet generator system according to the preceding embodiment, wherein the droplet generator unit is configured to create the droplets with a defined droplet generation frequency.

S4. The droplet generator system according to any of the 2 preceding embodiments, wherein the droplet generator unit is configured to generate disturbances and to transmit the disturbances to the droplet generator liquid flow, wherein, when dependent on the preceding embodiment, the droplet generation frequency corresponds to a frequency of the disturbances.

S5. The droplet generator system according to any of the preceding embodiments with the features of S3, wherein the droplet generation frequency is adjustable.

S6. The droplet generator system according to any of the preceding embodiments with the features of embodiment S3, wherein the droplet generator unit comprises an orifice, and wherein the droplet generator unit is configured to generate a liquid jet by the droplet generator liquid flow being guided through the orifice.

S7. The droplet generator system according to the preceding embodiment, wherein the orifice has an orifice diameter, preferably in the range of 1 µm to 50 µm, further preferably 3 µm to 40 µm, such as 5 µm to 20 µm.

S8. The droplet generator system according to the preceding embodiment, wherein the droplet generator unit further comprises a droplet flow region into which the droplets are introduced, wherein the droplet flow region comprises a diameter 30 to 10,000 times larger than the orifice diameter, preferably 50 to 2,000 times, such as 100 to 1,000 times.

S9. The droplet generator system according to any of the preceding embodiments, wherein the droplet generator system further comprises a controller for controlling the droplet generator unit.

S10. The droplet generator system according to the preceding embodiment and with the features of embodiment S5, wherein the controller is configured to control the droplet generation frequency.

S11. The droplet generator system according to the preceding embodiment, wherein the controller is configured to control the droplet generation frequency in dependence of the droplet generator liquid flow.

S12. The droplet generator system according to the preceding embodiment, wherein the controller is configured to control the droplet generation frequency proportionally to the droplet generator liquid flow.

S13. The droplet generator system according to any of the two preceding embodiments with the features of embodiment S7,
  wherein, for each droplet generator liquid flow in a droplet generator flow range having a lower limit and an upper limit, the upper limit being at least 2 times the lower limit,
  the controller is configured to control the droplet generation frequency (f) to be within a range defined by $0.5 \cdot v$ and $1.5 \cdot v$, preferably in a range defined by $0.8 \cdot v$ and $1.2 \cdot v$, such as within an range of $0.9 \cdot v$ and $1.1 \cdot v$, wherein $v = 0.28 \cdot F/D^3$, wherein D is the orifice diameter and F is the droplet generator liquid flow to the droplet generator.

S14. The system according to any of the preceding embodiments, wherein the system is configured to be used in a detector system, such as a charged aerosol detector system.

S15. The system according to any of the preceding embodiments, wherein the droplet generator unit is configured to generate droplets with a diameter distribution, such that in a graph depicting liquid volume as a function of the diameter of the droplets, the full width at half maximum (FWHM) is below $0.4 \cdot \overline{D}$, preferably below $0.3 \cdot \overline{D}$, further preferably below $0.2 \cdot \overline{D}$, such as below $0.1 \cdot \overline{D}$, where D is the volume based average droplet diameter.

S16. The system according to any of the preceding embodiments, wherein the droplet generator unit is a piezoelectric droplet generator unit.

S17. The system according to the preceding embodiment, wherein the droplet generator unit comprises a piezoelectric ceramic.

S18. The system according to the preceding embodiment, wherein the piezoelectric ceramic is configured for emitting mechanical waves.

S19. The system according to any of the 3 preceding embodiments, wherein the droplet generator unit comprises a voltage generator.

S20. The system according to the preceding embodiment and with the features of embodiment S17, wherein the droplet generator unit comprises an amplifier located between the generator and the piezoelectric ceramic.

S21. The system according to any of the preceding embodiments, wherein the droplet generator unit further comprises a gas conduit, wherein the gas conduit is configured for supplying the droplet generator unit with an gas stream with a flow rate between 0.1 and 10 L/min, preferably between 1 and 7 L/min, more preferably between 2 and 5 L/min.

S22. The system according to any of the preceding embodiments with the features of embodiment S6, wherein the droplet generator unit further comprises a housing, wherein the housing comprises the orifice.

S23. The system according to the preceding embodiment, wherein the housing is replaceable.

S24. The system according to any of the preceding embodiments with the features of embodiments S18 and S22, wherein the piezoelectric ceramic surrounds the housing.

S25. The system according to any of the preceding embodiments, wherein the droplet generator unit further comprises a droplet flow region.

S26. The system according to the preceding embodiment, wherein the system is configured to establish a flow velocity in the range of 1 m/s to 20 m/s in the droplet flow region, preferably 5 m/s to 10 m/s, such as 7 m/s to 9 m/s.

S27. The system according to any of the preceding embodiments, wherein the droplet generator unit is configured to generate droplets with a volume based average diameter in the range of 10 µm to 50 µm, preferably 15 µm to 25 µm.

S28. The system according to any of the preceding embodiments with the features of embodiment S19, wherein the voltage generator is an alternating current voltage generator.

S29. The system according to the preceding embodiment, wherein the voltage generator is configured to operate in a frequency range of 50 to 500 kHz, and preferably 100 to 300 kHz.

S30. The system according to any of the preceding embodiments, wherein the system comprises a flow control unit upstream of the droplet generator unit.

S31. The system according to the preceding embodiment, wherein for each incoming liquid flow in an incoming flow range, the flow control unit is configured to direct the droplet generator liquid flow in an outgoing flow range towards the droplet generator unit, wherein the incoming flow range has an incoming lower limit and an incoming upper limit, wherein the incoming upper limit is at least 10 times the incoming lower limit, preferably at least 30 times the incoming lower limit, such as at least 100 times the incoming lower limit, wherein the outgoing flow range has an outgoing lower limit and an outgoing upper limit, wherein the outgoing upper limit is at most 5 times the outgoing lower limit, preferably at most 4 times the outgoing lower limit, further preferably at most 3 times the outgoing lower limit, such as at most 2.5 times the outgoing lower limit.

S32. The system according to the preceding embodiment, wherein for each incoming flow in the range of 25 µl/min to 2500 µl/min, the flow control unit is configured to direct the droplet generator liquid flow in the range of 10 µl/min to 100 µl/min to the droplet generator unit.

S33. The system according to any of the 2 preceding embodiments, wherein the flow control unit comprises a splitter element.

S34. The system according to the preceding embodiment, wherein the splitter element is configured and located to split the incoming liquid flow into an outgoing flow path towards the droplet generator unit and into an additional flow path.

S35. The system according to the preceding embodiment, wherein the flow control unit further comprises a flow resistive element in the outgoing flow path.

S36. The system according to the preceding embodiment, wherein the flow control unit further comprises an extra volume element in the outgoing flow path.

S37. The system according to any of the 3 preceding embodiments, wherein the flow control unit is configured to set a flow resistance in the additional flow path to different values.

S38. The system according to any of the 4 preceding embodiments, wherein the additional flow path comprises a primary flow path, a plurality of secondary flow paths, and a flow selection valve configured to establish a connection between the primary flow path and each of the plurality of second flow paths, respectively.

S39. The system according to the preceding embodiment, wherein the secondary flow paths comprise a set of secondary flow paths, wherein each secondary flow path of this set comprises a secondary flow resistive element, respectively.

S40. The system according to the preceding embodiment, wherein the secondary flow resistive elements are different from one another.

S41. The system according to any of the 2 preceding embodiments and with the features of embodiment S35, wherein a delay time in the flow resistive element in the outgoing flow path is substantially identical to a delay time in each of the secondary flow resistive elements.

S42. The system according to any of the preceding embodiments with the features of embodiments S36 and S38, wherein a volume of the extra volume element corresponds to a volume of the flow selection valve.

S43. The system according to any of the preceding embodiments with the features of embodiment S39, wherein the secondary flow paths comprise a dead end flow path.

S44. The system according to any of the preceding embodiments with the features of embodiment S30, wherein the flow control unit further comprises a waste.

S45. The system according to the preceding embodiment, wherein the waste is located downstream of the additional flow path.

S46. The system according to any of the preceding embodiments, wherein the system is configured to generate water droplets from water, methanol droplets from methanol, and acetonitrile droplets from acetonitrile, wherein the water droplets have a volume based average water droplet size, the methanol droplets have a volume based average methanol droplet size, and the acetonitrile droplets have a volume based average acetonitrile droplet size, wherein the average methanol droplet size and the average acetonitrile droplet size are within a range defined by 0.5× the average water droplet size and 1.5× the average water droplet size, preferably in a range defined by 0.8× the average water droplet size and 1.2× the average water droplet size, such as in a range defined by 0.9× the average water droplet size and 1.1× the average water droplet size.

Below, embodiments relating to a detector system will be discussed. These embodiments are abbreviated by the letter "C" followed by a number. When reference is herein made to a detector embodiment, those embodiments are meant.

C1. A detector system comprising the droplet generator according to any of the preceding embodiments.

C2. The detector system according to the preceding embodiment, wherein the detector system further comprises an evaporation section configured for solvent evaporation.

C3. The detector system according to any of the preceding detector embodiments, wherein the detector system further comprises a mixing chamber configured for interaction of particles generated by drying the droplets with a stream of charged ions.

C4. The detector system according to the preceding embodiment, wherein the mixing chamber is connected to an ion charger configured for electrically charging a gas stream.

C5. The detector system according to any of the preceding detector embodiments, wherein the detector system further comprises an ion trap configured for eliminating ions with a high electric mobility.

C6. The detector system according to any of the preceding detector embodiments, wherein the detector system further comprises an ampere meter configured for measuring a charge of particles.

C7. The detector system according to the preceding embodiment, wherein the detector system further comprises a transducer configured for converting the measured charge into human-readable signal.

C8. The detector system according to the preceding embodiment, wherein the human-readable signal is a chromatographic spectrum.

C9. The detector system according to any of the preceding detector embodiments, wherein the detector system does not comprise an impactor downstream of the droplet generator system.

C10. The detector system according to any of the preceding detector embodiments, wherein the detector system comprises a discharge assembly located downstream of the droplet generator unit and upstream of the evaporation section.

C11. The detector system according to any of the preceding detector embodiments, wherein the detector system is a charged aerosol detector system.

C12. The detector system according to any of the embodiments C1 to C11, wherein the detector system is a mass spectrometry system.

Below, method embodiments will be discussed. These embodiments are abbreviated by the letter "M" followed by a number. When reference is herein made to a method embodiment, those embodiments are meant.

M1. An analytical method, the method comprising using the droplet generator system according to any of the preceding DG embodiments or a detector system according to any of the preceding detector embodiments.

M2. The method according to the preceding embodiment, wherein the method further comprises the droplet generator unit creating droplets from a liquid supplied to the droplet generator unit with a droplet generator liquid flow.

M3. The method according to the preceding embodiment, wherein the method further comprises the droplet generator unit creating the droplets with a defined droplet generation frequency.

M4. The method according to any of the 2 preceding embodiments, wherein the method further comprises the droplet generator unit generating disturbances and transmitting the disturbances to the droplet generator liquid flow, wherein, when dependent on the preceding embodiment, the droplet generation frequency corresponds to a frequency of the disturbances.

M5. The method according to any of the preceding embodiments with the features of embodiment M3, wherein the method further comprises adjusting the droplet generation frequency.

M6. The method according to any of the preceding method embodiments, wherein the droplet generator system comprises the features of S6, wherein the method further comprises the droplet generator unit generating a liquid jet by the droplet generator liquid flow being guided through the orifice.

M7. The method according to any of the preceding method embodiments, wherein the droplet generator system comprises the features of S10, wherein the method further comprises the controller controlling the droplet generator unit.

M8. The method according to any of the preceding method embodiments with the features of M5, wherein the method further comprises the controller controlling the droplet generation frequency.

M9. The method according to any of the preceding method embodiments, wherein the method further comprises the controller controlling the droplet generation frequency in dependence of the droplet generator liquid flow.

M10. The method according to the preceding embodiment and with the features of M2, wherein the method further comprises the controller controlling the droplet generation frequency proportionally to the droplet generator liquid flow.

M11. The method according to any of the 2 preceding embodiments, wherein the droplet generator system comprises the features of S7, wherein the method further comprises
the controller controlling the droplet generation frequency (f) to be within a range defined by $0.5 \cdot v$ and $1.5 \cdot v$, preferably in a range defined by $0.8 \cdot v$ and $1.2 \cdot v$, such as within a range of $0.9 \cdot v$ and $1.1 \cdot v$, wherein $v=0.28 \cdot F/D^3$, wherein D is the orifice diameter and F is the droplet generator liquid flow to the droplet generator.

M12. The method according to any of the preceding embodiments, wherein the method comprises the droplet generator unit generating droplets with a diameter distribution, such that in a graph depicting liquid volume as a function of the diameter of the droplets, the full width at half maximum (FWHM) is below $0.4 \cdot \overline{D}$, preferably below $0.3 \cdot \overline{D}$, further preferably below $0.2 \cdot \overline{D}$, such as below $0.1 \cdot \overline{D}$, where $\overline{D}$ is the volume based average droplet diameter.

M13. The method according to any of the preceding method embodiments, wherein the method comprises generating droplets with a volume based average diameter in the range of 10 μm to 50 μm, preferably 15 μm to 25 μm.

M14. The method according to any of the preceding method embodiments wherein the droplet generator system comprises the features of S30, wherein the method comprises
the flow control unit receiving a first incoming liquid flow and feeding a first outgoing liquid flow of the first incoming liquid flow towards the droplet generator unit;
the flow control unit receiving a second incoming liquid flow and feeding a second outgoing liquid flow of the second incoming liquid flow towards the droplet generator unit;
wherein the ratio between the first incoming liquid flow and the second incoming liquid flow is greater than 10, and wherein the ratio between the first outgoing liquid flow and the second outgoing liquid flow is smaller than 5.

M15. The method according to any of the preceding method embodiments, wherein the method comprises
the flow control unit receiving an incoming liquid flow exceeding 500 μl/min, preferably exceeding 1,000 μl/min, further preferably exceeding 2,000 μl/min, and the flow control unit feeding an outgoing liquid flow of the incoming liquid flow towards the droplet generator unit, wherein the outgoing liquid flow is below 300 μl/min, preferably below 200 μl/min, such as below 100 μl/min.

Below, use embodiments will be discussed. These embodiments are abbreviated by the letter "U" followed by a number. When reference is herein made to a use embodiment, those embodiments are meant.

U1. Use of the droplet generator system according to any of the preceding DG embodiments or a detector system according to any of the preceding detector embodiments for a method according to any of the preceding method embodiments.

U2. Use according to the preceding embodiment in chromatography.

U3. Use according to the preceding embodiment in liquid chromatography.

U4. Use according to the preceding embodiment in high performance liquid chromatography.

U5. Use according to the preceding embodiment in ultra-high performance liquid chromatography.

BRIEF DESCRIPTIONS OF DRAWINGS

The present invention will now be described with reference to the accompanying drawings which illustrate embodiments of the invention. These embodiments should only exemplify, but not limit, the present invention.

DETAILED DESCRIPTION OF EMBODIMENTS

It is noted that not all the drawings carry all the reference sings. Instead, in some of the drawings, some of the reference sings have been omitted for sake of the brevity and simplicity of illustration. Embodiments of the present invention will now be described with reference to the accompanying drawings.

Generally, an HPLC effluent may comprise a liquid system, which may further comprise at least one eluent agent and at least one sample. The HPLC effluent may also be referred to as HPLC liquid, or simply as effluent or liquid. In the below, most often, just the term "liquid" will be used. It should be understood that the liquid typically comprises the sample to be analyzed and a solvent.

In a detector system, an HPLC effluent may be transferred initially from a separation column into an aerosol. It should be understood that the detector system primarily described in the following is a charged aerosol detector (CAD) system. However, it should be understood that the present invention is not limited to its application in CAD systems, but can also be used in other detection systems, such as mass spectrometry systems. The elution agent of the aerosol drops is evaporated so that the analyte to be measured is transferred into a secondary, mostly dry, aerosol. This aerosol may then be charged electrically. The charge of the aerosol may be measured in an ampere meter. The current measured may be a measure for the analyte quantity. One difference to the widespread UV detectors is that the CAD method does not requiring any chromophores in the analyte. Thus, this detector is referred to as a universal detector.

Figure 1:
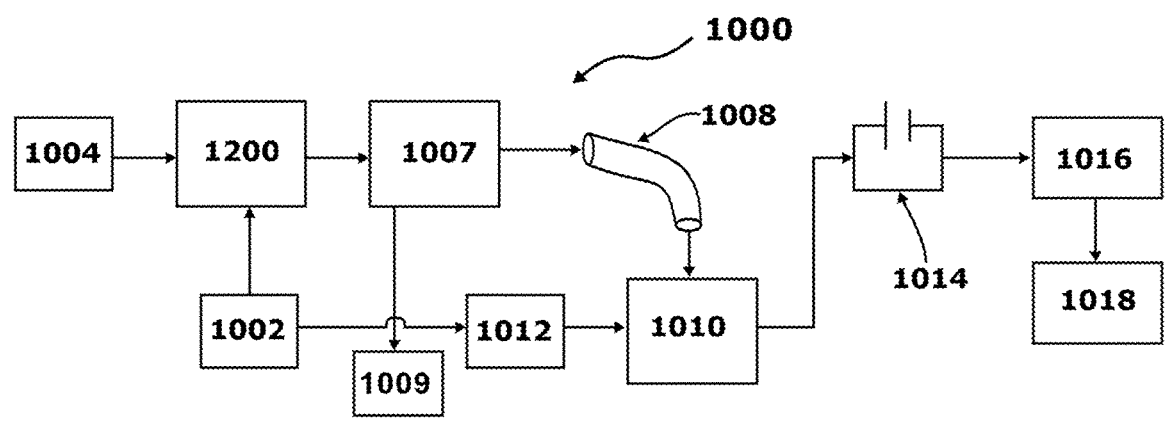
FIG. 1 depicts a CAD system according to the prior art, wherein components of this system can also be used in embodiments of the present invention.

FIG. 1 depicts a CAD system 1000 according to the prior art. It should be understood that some components of this system 1000 may also be used in embodiments of the present invention. The charged aerosol detector may also be referred to as system 1000. In simple terms, the system 1000 comprises an inlet 1002 for supplying the system 1000 with an inert gas, for example, nitrogen, and an effluent inlet 1004 for conducting effluent. In some embodiments, the CAD system 1000 may be employed in an HPLC system and may in fact be part of an HPLC system. In such systems, inlet 1004 may also be referred to as HPLC inlet 1004, as it may receive effluent from an HPLC column. However, it will be understood that the presently described technology is not limited to an application in HPLC and may in fact also be used in other applications.

The inlet 1002 may also be referred to as inert gas inlet 1002 or simply as gas inlet 1002. In some embodiments, an inert gas, such as $N_2$ may be used. This may be employed for safety reasons, not to create an inflammable (or explosive) composition. However, it may also be possible to use other gases, such as air. The HPLC inlet 1004 may also be referred to as HPLC column effluent inlet 1004, effluent inlet 1004 or simply as sample inlet 1004. The system 1000 also comprises a nebulizer 1200 for generating a spray of fine droplets of a liquid supplied by a sample inlet 1004.

In simple words, an HPLC effluent is supplied to a nebulizer 1200 through an inlet 1004. At the same time, an inert gas is fed to the nebulizer 1200 through a gas inlet 1002. In simple terms, the nebulizer 1200 comprises a capillary inlet connected to the HPLC inlet 1004 and a coaxial inert gas flow is fed by a gas inlet 1002. The nebulizer 1200 generates a spray of fine droplets of an HPLC effluent.

Further, the system 1000 comprises a spray chamber 1007, which receives the spray of fine droplets formed in the nebulizer 1200. Once a spray stream is fed to the spray chamber, the droplets formed travel a certain distance. Droplets of sufficiently small size, i.e. small mass, are entrained by the gas flow travelling to the upper region of the spray chamber 1007. The droplets are directed to a drying pipe 1008, which may also be referred to as drying tube 1008, evaporation tube 1008 or evaporation pipe 1008. The droplets that are not able to travel to the upper region within the spray chamber 1007, i.e. the droplets that are not small enough to be carried by the gas to the upper region of the spray chamber 1007, impact the back wall of the spray chamber 1007. These relative large droplets are thus "absorbed" by a liquid formed on the back wall of the impactor. These relatives large droplets thus become part of the liquid formed on the back wall of the impactor. This liquid flows down and finally drains out of the spray chamber 1007 into a drain 1009. The smaller droplets that are able to travel to the upper region of the spray chamber 1007 travel through a drying tube 1008, which allows further evaporation of the remaining volatile portions of the droplets, e.g. further evaporation of remaining solvent. The evaporation of the remaining volatile portion of the droplets may be obtained, for example, by heating the drying tube 1008.

In other words, the droplets formed by the nebulizer 1200 are fed to a spray chamber 1007, where droplets of relative smaller sizes are able to negotiate their trajectory to the upper region of the spray chamber 1007 to subsequently travel through a heated evaporation sector referred to as drying tube 1008. While passing through the drying tube 1008, the droplets are dried by elimination of residual volatile liquid, i.e. solvent. The droplets exit the drying tube 1008 as dry solid particles. It will generally be understood that the purpose of the drying tube 1008 is to remove the solvent. Most substances, when all the solvent is removed, will form dry particles (i.e., they will be solid) at the end of the drying tube 1008. However, depending on the details of the phase transition, some substances (even after all the solvent has been removed) may also be in the liquid phase. For sake of simplicity, these substances, when the solvent is removed after the drying tube, may also be encompassed by the term "particle".

After drying, the particles are fed to a mixing chamber 1010, which is also supplied with a stream of an inert gas by a gas inlet 1002. Previously to entering the mixing chamber 1010, the inert gas is electrically charged with a charger 1012 and supplied in excess to the mixing chamber 1010. The charged (inert) gas interacts with the particles to form electrically charged particles, which are directed, alongside with the excess charged gas, to a collector 1016. Prior to entering the collector 1016, the charged particles, and the excess charged gas, pass through an ion trap 1014 that eliminates ions of high electrical mobility, i.e. the ion trap 1014 removes charged gas particles (e.g., charged $N_2$ particles), and also other small charged particles (e.g., particles with a size of up to 6 nm). The collector 1016 is an ampere meter, therefore it may also be referred to as ammeter 1016. Subsequently, the ammeter 1016 transfers a signal to a terminal device 1018. The signal emitted by the ammeter 1016 is a result of the discharging of the charged particles. The intensity of the signal is proportional to the amount of charge contained in the particles, which is related to the quantity of analyte contained in the particles (and thus, also in the droplets).

Shortly summarized, the charged aerosol detector 1000 operates by supplying an (inert) gas stream (injected by an inlet 1002) by means of a nebulizer 1200 to a liquid fed by an effluent inlet 1004 for producing droplets. Non suitable droplets are eliminated into the drain 1009, and then the remaining solvent is evaporated through an evaporation pipe 1008. In a mixing chamber 1010, a surface charge is imparted to the particles by a charger 1012, and particles with high electrical mobility are eliminated by an ion trap 1014. Subsequently, the charged particles are measured by an ampere meter 1016, and the measured charge is related to the amount of analyte in the injected sample and expressed as a chromatographic spectrum 1018.

In more simple words, the CAD system 1000 makes use of a pneumatic nebulizer 1200 in order to generate an aerosol from a solvent comprising a sample. This aerosol will also be referred to as the primary aerosol. This primary aerosol is then dried in a drying tube 1008, which may be heated, if applicable, to generate a secondary aerosol, which typically comprises solid particles. The transport of the aerosol through this drying tube 1008 is effected by the gas from the nebulizer 1200 supplied by the inlet 1002. At the end of the drying tube 1008, the solvent has evaporated. Then, the secondary aerosol is charged, e.g., by means of charged nitrogen ions in a mixing chamber 1010. This charging process is essentially a diffusion charging process. Then, the charged particles are discharged in a filter amperemeter 1016, the discharge current being measured. An ion trap 1014 is placed upstream of the filter amperemeter 1016. This ion trap 1014 removes charged nitrogen ions out of the gas flow, as these should not be measured in the amperemeter 1016. Another component used is an impactor located in the spray chamber 1007, also known as the back wall of the spray chamber 1007. The function of the impactor consists in removing very large drops from the aerosol. This is to avoid excess liquid from being introduced into the drying tube 1008 and complete evaporation is not effected due to the transport flow in the drying tube 1008 being saturated.

However, while the described CAD system 1000 may yield satisfactory results in some instances, it may have certain drawbacks and disadvantages. In particular, it has been found that the CAD system 1000 of FIG. 1 is not ideal. In particular, the results (i.e., the current measured by the ampere meter 1016) may heavily depend on the solvent used. That is, the same sample in different solvents may yield different currents at the ampere meter, which may render the further usage of the results cumbersome.

Initially, features of embodiments of the present technology (i.e., the technology outlined in this document) will be outlined with general reference to FIGS. 2 to 4, before describing details of the individual components with more particular reference to the individual Figures.

As discussed, prior CAD systems may have the disadvantage that they heavily depend on the solvent used. E.g., if a sample is solved in water, and in methanol, the resulting current, for the same concentration of the sample, may be different depending on whether the sample was solved in water or in methanol. Embodiments of the present technology overcome or at least alleviate this dependency on the solvent by additional features, which may be employed individually or in concert.

As depicted in FIG. 2, embodiments of the present technology may comprise a flow control unit 100 located upstream of a droplet generator 200. The flow control unit 100 may control a flow of liquid (which liquid typically comprises the solvent and the sample) to the droplet generator 200. Thus, only a defined amount of liquid flow (or a liquid flow in a defined range) may arrive at the droplet generator 200. For example, the flow control unit 100 may be configured so that an incoming flow in the range of 25 μl/min to 2500 μl/min leads to an outgoing flow to the droplet generator 200 in the range of 25 μl/min to 56 μl/min. That is, the flow control unit 100 may be configured to have an outgoing flow in the range of 25 μl/min to 56 μl/min for all in coming flows in the range of 25 μl/min to 2500 μl/min. Thus, the liquid flow supplied to the droplet generator 200 may always be in a very defined range.

This may be advantageous for the following reason. It will be understood that the droplet generator 200 generates droplets based on the liquid flow arriving at the droplet generator 200. Further, gas is supplied to the droplets by means of a gas inlet 2002, to thus form an aerosol. This aerosol directly downstream of the droplet generator 200 may also be referred to as the primary aerosol. The primary aerosol is then guided through a drying tube 2008. Ideally, at the end of the drying tube 2008, all of the solvent has evaporated, and particles are formed.

To achieve this, it is advantageous that the liquid flow towards the droplet generator 200 is in a defined (and relatively low) range. Consider, e.g., the situation that the gas inlet 2002 feeds a constant flow of a gas (e.g., air, though also other gases, such as $N_2$ can be used) of 3 l/min.

Further, at atmospheric conditions and at an exemplary temperature of 25° C., 100% air humidity is reached at a concentration (water in air) of 23 g/m$^3$. In other words, 1 m$^3$ of air can accommodate 23 g of water vapor. That is, 1 l of air can accommodate 23 mg of water vapor approximately corresponding to 23 μl of solvent water. Thus, when having an air flow of 3 l/min, approximately 69 μl/min of liquid water can be evaporated before the air is saturated with water vapor.

Thus, by ensuring that only a defined (and relatively low) flow of liquid arrives at the droplet generator 200, embodiments of the present technology ensure that (almost) all the liquid can be evaporated in the drying tube 2008.

Further, it is also noted that only a limited amount of time will be spent in the drying tube 2008, which may also hinder the complete evaporation. Also for this reason, it is beneficial that only a defined (and relatively low) flow of liquid arrives at the droplet generator 200 and thus in the drying tube 2008.

Furthermore, also in light of the limited amount of time that will be spent in the drying tube, it may be beneficial to generate relatively small droplets, as it may be difficult to completely evaporate large droplets in a limited amount of time in the drying tube.

It will be understood that this reduces the dependency on the solvent, as different solvents may reach their saturation at different points.

Further, in embodiments of the present technology, a particular droplet generator 200 may be employed. More particularly, the droplet generator 200 may cause the droplets to form with a frequency that is adjustable. This frequency may also be referred to as the droplet generation frequency. In that regard, reference is made to FIG. 4, depicting an example of such a droplet generator 200.

As discussed, there is a liquid flow 226 in a controlled range from the flow control unit 100 to the droplet generator 200. In the depicted embodiment, the flow 226 is channeled through a housing 210 and exits the housing through an orifice 211 having an orifice diameter. Thus, a jet 228 of liquid is generated. This jet 228 of liquid breaks down into individual droplets 224. More particularly, disturbances in the jet 228 cause the jet 228 to break down to individual droplets 224. The fastest growing perturbations lead to the jet 228 breaking down to droplets 224 having a droplet diameter $D_{droplet}=1.89$ D, where D is the diameter of the orifice 211.

This can be used to support perturbations at (or close to) the fastest growing perturbation. Consider that a flow of, e.g., 40 µl/min arrives at the droplet generator 200 and that the droplet generator has an orifice 211 with a diameter of 10 µm. The fastest growing perturbation will thus lead to droplets 224 with a diameter of approximately 19 µm, i.e. droplets 224 with a volume $V_{droplet}$ of $3.6 \cdot 10^{-15}$ m³ = $3.6 \cdot 10^{-12}$ l = $3.6 \cdot 10^{-6}$ µl.

Now, consider an exemplary liquid flow of 40 µl/min arriving at the droplet generator 200, This corresponds to a flow of 0.67 µl/s. Dividing the flow by the above calculated volume of the droplet leads to a droplet generation frequency f of 185 kHz. In the depicted example, the droplet generator 200 supports the fastest growing perturbation by generating disturbances with the respective frequency. This frequency may also be referred to as the frequency of the disturbances and may generally correspond to the droplet generation frequency.

That is, when the droplet generator 200 causes a perturbation with this frequency, this will support the fastest growing perturbation naturally occurring in the liquid jet 228, and will trigger that the droplets 224 are formed according to this perturbation and with the above discussed diameter. It should be understood that similar considerations also apply when causing an external perturbation close to the fastest growing natural perturbation.

In the depicted embodiment, the perturbation is caused by a piecoelectric element 206 that can be excited electronically with different excitation frequencies. However, it should be understood that this is merely exemplary and that other realizations are also possible.

In summary, the droplet generator 200 may cause perturbation of the liquid flow with a frequency that is adjustable. In embodiments of the present invention, this frequency (which may also be referred to as the droplet generation frequency) is controlled by the liquid flow arriving at the droplet generator 200 in such a manner that it supports droplets to form having a diameter at (or close to) the diameter of the droplets that would be caused by the fastest growing perturbation occurring in the liquid flow.

Notably, the above discussed droplet formation is relatively independent from the liquid and thus the solvent used. That is, the above discussed droplet formation results in droplet sizes (or droplet size distributions) that are relatively independent from the solvent.

This may be highly beneficial for the further analysis. It will be understood that after the drying tube 2008, when the solvent has evaporated, particles are formed. The particles, together with the gas, thus form an aerosol, which may also be referred to as the secondary aerosol. In the mixing chamber 2010, these particles are charged by a diffusion charging process. This process deposits the charges on the particles proportional to the diameter of the particles. That is, a particle that is 8 times larger in volume than another particle would only carry double the charge of the other particle.

It may thus be problematic when different solvents would lead to different droplet sizes (or droplet size distributions), and thus to different particles sizes (or particle size distributions). By the above means, embodiments of the present technology may overcome this problem.

Generally, the above means may render the droplet sizes independent of the solvent and of the incoming flow. Thus, also the current signal at the ampere meter 2016 is relatively independent of the solvent, allowing a simple and convenient linearization of the signal.

Generally, it should be understood that the presently described technology may comprise a lower detection limit of approximately 0.1 ppm, mainly defined by the purity of the solvent. It may thus comprise a relatively large dynamic range.

In the below, further details of embodiments of the present technology will be described.

Figure 2:
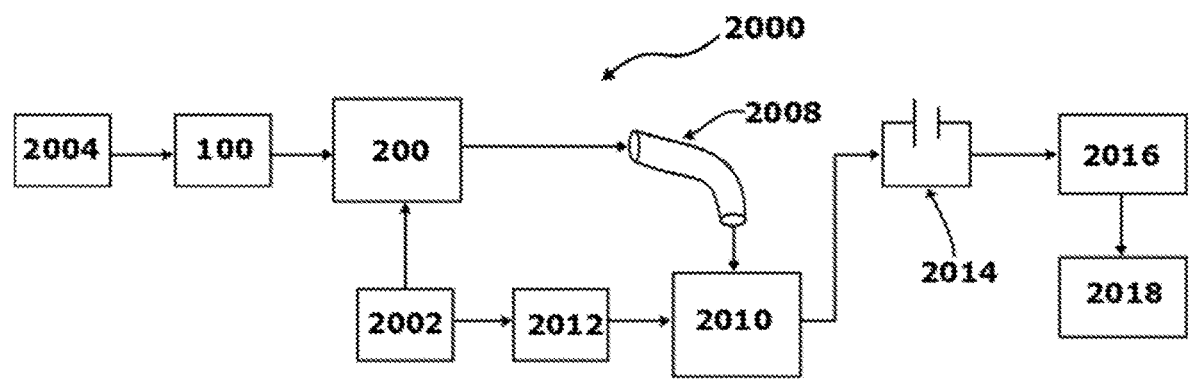
FIG. 2 depicts a CAD system according to embodiments of the present invention.
Figure 3:
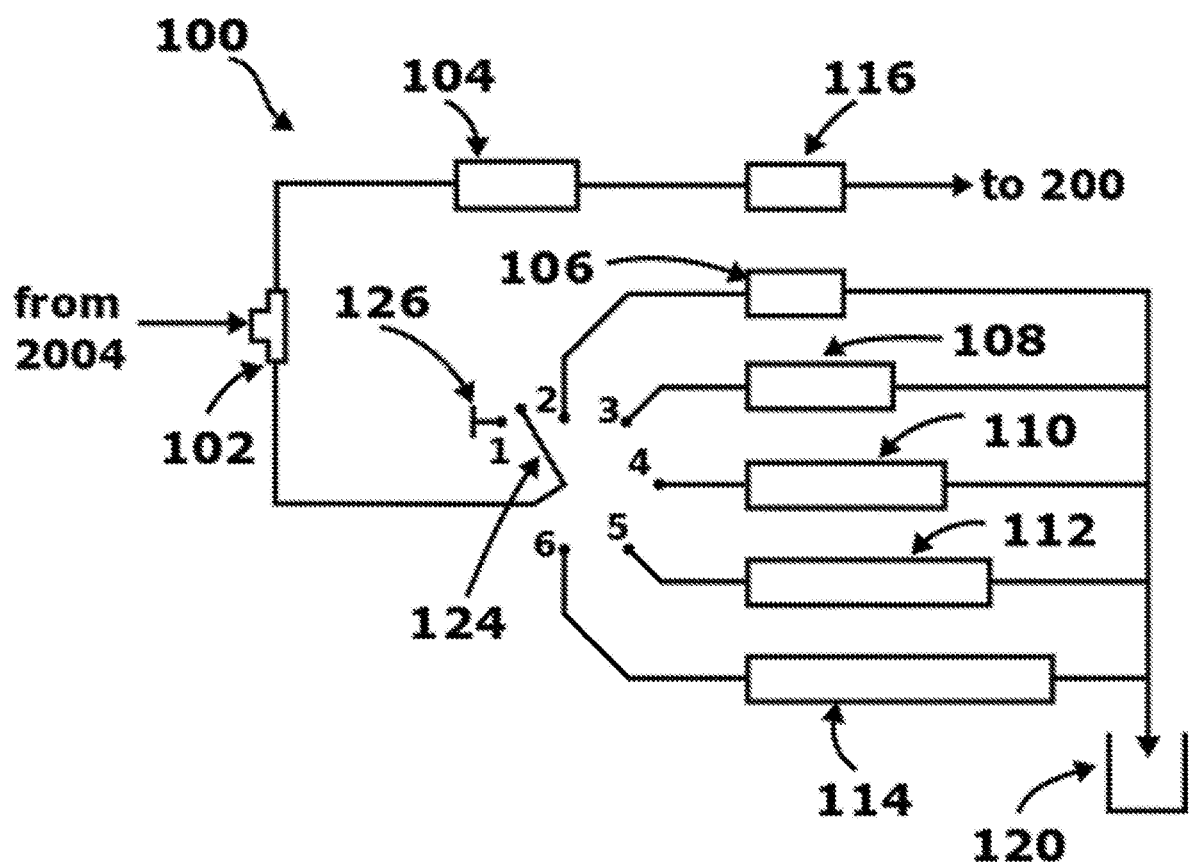
FIG. 3 depicts a splitter according to embodiments of the present invention.
Figure 4:
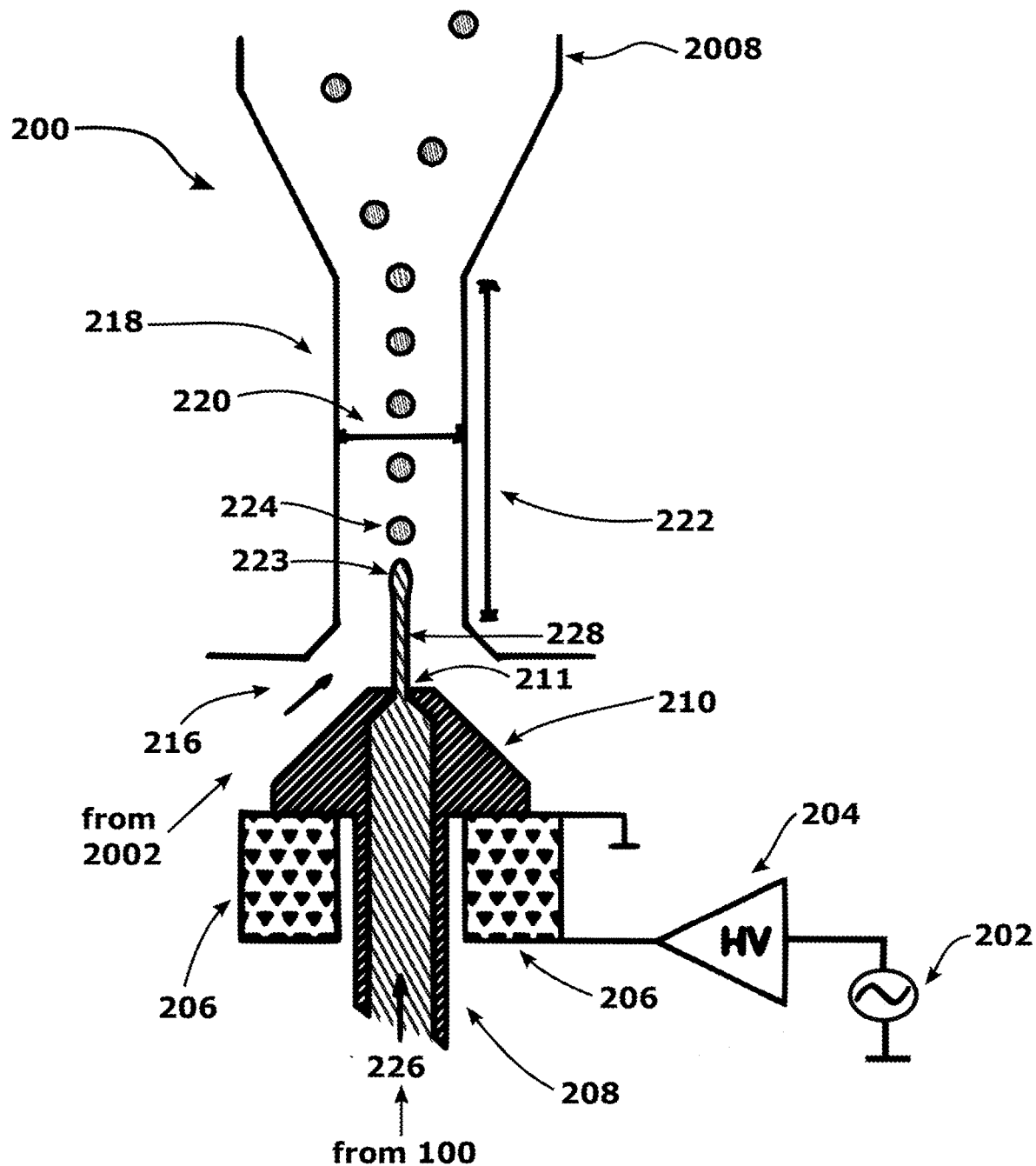
FIG. 4 depicts a droplet generator according to embodiments of the present invention.

FIGS. 2 to 4 depict a detector system 2000 (e.g., a CAD system) according to embodiments of the present invention. It will be understood that some components of the CAD system 2000 may be as described before with reference to FIG. 1. However, there are some features which are different.

In simple words, the depicted embodiment comprises at least two elements that are different from the system 1000 in FIG. 1. Embodiments of the present invention may comprise both these features (as the presently described) or one of them.

The system 2000 depicted in FIG. 2 comprises an inlet 2004 and a droplet generator 200, which may also be referred to as a nebulizer.

However, in addition to that, the system in FIG. 2 also comprises a flow control unit 100 or flow control element 100 configured to control the flow of liquid from the inlet 2004 to the droplet generator. In other words, downstream from the inlet 2004 and upstream from the droplet generator 200, a flow control unit 100 may be located. Further details of a possible configuration of the flow control unit 100 are described below, particularly with reference to FIG. 3.

Further, a particularly configured droplet generator 200 is used being operable as outlined above. For example, a piezo-electric droplet generator may be used by the present technology.

As discussed, these features (i.e., the flow control unit 100 and the particular type of droplet generator 200) may be employed independently from one another or together—as in the presently described embodiment.

This may lead to some benefits when compared to the system 1000 of FIG. 1. As discussed, in the system of FIG. 1, there is typically provided a spray chamber 1007 with an impactor downstream of the nebulizer 1200. Here, some of the larger droplets are separated from the smaller droplets which are used for further analysis.

However, in the system 1000 of FIG. 1, the portion of the liquid that is separated and not used for further analysis is separated in a relatively uncontrolled manner, such that it is not easily possible to determine which ratio of the liquid is used for the subsequent analysis. In contrast to that, in addition to the benefits outlined above, in the system 2000 of FIG. 2, the amount of liquid that is subsequently used and analyzed is controlled upstream of the droplet generator 200. This leads to a more controlled analysis.

Further, the droplet generator 200 may be different from droplet generators, e.g., nebulizers employed in prior art systems. In particular, the droplet generator may be configured to generate droplets with a size or a size distribution which is mostly independent of the liquid (and thus the solvent used).

Further, the droplet generator may also generate the droplets 224 with a relatively narrow droplet size distribution. For example, the droplet size distribution may be represented by a graph depicting liquid volume as a function of the diameter of the droplets. That is, such a graph depicts for each (interval of) droplet size, which total liquid volume is contained in droplets of such sizes. In such a graph, the full width at half maximum (FWHM) is below 0.4·$\overline{D}$, where $\overline{D}$ is the volume based average droplet diameter, i.e., $$\overline{D} = \frac{\sum_{i=1}^{n} D_i \cdot V_i}{\sum_{i=1}^{n} V_i}$$

where i is the individual particle, n is the total number of particles, $D_i$ is the diameter of the individual particle and $V_i$ is the volume of the individual particle. Preferably, the FWHM is below 0.3·$\overline{D}$, further preferably below 0.2·$\overline{D}$, such as below 0.1·$\overline{D}$.

For example, such a narrow droplet size distribution may be achieved when the droplet generator 100 is realized as a piezoelectric droplet generator.

Having such a narrow droplet size distribution may be beneficial, as the relation between the droplet size and the charge it carries after being charge is not linear. The reason for non-linearity is to be found in the charging mechanism in the mixing chamber 1010, 2010. The charging mechanism is a diffusion charging mechanism which results in a charge of the particles which is proportional to the particle diameter. Particles which have the 8-fold quantity of analyte have only twice its charge.

Thus, having particles with a relatively narrow size distribution may be beneficial. In contrast to that, physical properties of the liquid give rise to drops of different sizes during pneumatic nebulization. A certain amount of liquid, distributed to few large drops, leads to specific current measures. If, however, the same quantity of liquid is distributed to many small drops, the measuring current is considerably higher. Chromatography often uses gradients, which means that the composition of the elution agent changes during one chromatogram. This gradient reflects the problem of solvent dependence, and therefore, identical quantities of analyte result in peaks of different sizes, if the peaks elute at times of different compositions of elution agent.

Due to the reasons outlined above, it may be beneficial to have a relatively narrow droplet size distribution, which may give rise to improved results of subsequent analyses.

Further, the system 2000 depicted in FIG. 2 may also not comprise a spray chamber with an impactor and a drain (cf. 1007 and 1009 in FIG. 1). This may be beneficial, as the CAD system 1000 of FIG. 1 may give rise to a certain extent of re-nebulization from the drainage sump always being affected if a spray chamber 1200 with drainage is used. This may cause, after a large signal, the generation of small signal peaks, which compete with signals of other substances (which elutes shortly after the first substance), thus limiting the dynamics for signals located at a close distance.

Also the omission of such an impactor and a drain may thus lead to superior analytical results.

Thus, the system 2000 of FIG. 2 may be less dependent on the solvent. Other systems, such as the system 1000 of FIG. 1 may heavily depend on the solvent used.

There are different reasons for solvent dependence in prior systems, such as the system 1000 of FIG. 1. The quantity of liquid which arrives in the drying tube depends on the size of the portion which is separated via the impactor and thus, of course, does not contribute to the measurement. Further, the physical properties of the liquid give rise to drops of different sizes during pneumatic nebulization. That is, different liquids will lead to a substantially different size distribution of the droplets that are generated. A certain amount of liquid, distributed to few large drops, results in a certain measuring current. If, however, the same quantity of liquid is distributed to many small drops, the measuring current is considerably higher.

These issues are not present in the CAD system 2000 of FIG. 2. Different to the system 1000, the CAD system 2000 controls the liquid flow upstream of the droplet generator 200 and does not separate droplets in an uncontrolled manner. Further, by using a different droplet generator (e.g., which generates droplets at a defined frequency), the droplet size distribution is more narrow, and not so heavily dependent on the solvent used. Thus, the CAD system 2000 may yield superior analysis results.

Further features of the depicted embodiments will now be described.

FIG. 2 depicts a CAD system 2000 according to embodiments of the present invention. The CAD system 2000 may also be referred to as system 2000. In simple terms, the system 2000 comprises an inlet 2002 for supplying the system 2000 with a gas, for example an inert gas, such as nitrogen, and a liquid inlet 2004. In some embodiments, the inlet may be an HPLC inlet 2004 for conducting HPLC column effluent. The inlet 2002 may also be referred to as inert gas inlet 2002 or simply as gas inlet 2002. The HPLC inlet 2004 may also be referred to as HPLC column effluent inlet 2004, effluent inlet 2004 or simply as liquid inlet 2004. Again, it will be understood that it is not critical that the present technology be used in an HPLC system, i.e., the sample may also be supplied from another entity than an HPLC column.

The system 2000 also comprises a droplet generator system 200 or nebulizer system 200 for generating a spray of fine droplets from a liquid supplied by a sample inlet 2004, which droplets are entrained in a gas stream supplied by a gas inlet 2002. The nebulizer system 200 may also simply be referred to as nebulizer 200.

Further, the system 2000 also comprises a flow control ensemble 100 located between the sample inlet 2004 and the nebulizer 200. The flow control ensemble 100 may also be referred to as flow control unit 100 or flow control system 100. The flow control unit 100 is configured to direct a defined flow of liquid to the nebulizer. When terms like "after", "before" or "between" are used in this specification, it will be understood that such terms usually denote the location in a flow path. That is, the term an element A being located "before" another element B denotes that element A is located upstream of element B. Further, an element B being located "after" another element A denotes that element B is located downstream of element A. Further, when an element B is said to be located between element A and C, this should denote that element B is located downstream of one of element A and C and upstream of the other one of element A and C.

In simple words, a liquid (e.g., an HPLC effluent) is supplied to a nebulizer 200 through an inlet 2004. At the same time, a gas is fed to the nebulizer 200 through a gas inlet 2002. Further, the system 2000 comprises a flow control ensemble 100 (see explanation of FIG. 3) connected to the HPLC inlet 2004 and to the nebulizer 200 that may also be referred to as droplet generator 200 (see explanation of FIG. 4). The nebulizer 200 generates a spray of droplets by disintegration of the liquid into droplets expelled into an inert gas stream. In simple terms, the flow control unit 100 comprises a plurality of components that may allow control (and reduction) of the liquid rate to optimal values and the droplet generator system 200 subsequently may permit the application of mechanical ultrasonic waves, which by propagation may assist in decomposing the reduced flow rate into droplets. The formed droplets may be transported to a drying pipe 2008, which may also be referred to as drying tube 2008, evaporation tube 2008 or evaporation pipe 2008.

After drying, particles are created, and are fed to a mixing chamber 2010, which is also supplied with a stream of a gas by a gas inlet 2002. It should be understood that the gas inlet 2002 for supplying gas after the drying chamber may be the gas inlet that supplies the gas to the droplet generator 200. However, in other embodiments, there may also be employed separate gas inlets (which may also be referred to as gas supplies) for the droplet generator 200 and after the drying chamber.

Previous to entering the mixing chamber 2010, the gas may be electrically charged by means of a charger 2012, and supplied in excess to the mixing chamber 2010. The charged gas interacts with the particles to form electrically charged particles, which are directed, alongside with some excess charged gas, to a collector 2016. Prior to entering the collector 2016, the charged particles, and the excess charged gas, pass through an ion trap 2014 that eliminates the ions of high electrical mobility, i.e. the ion trap 2014 eliminates charged gas particles, and also small charged particles—typically, particles with a size smaller than approximately 10 nm may be removed by the ion trap. These particles may also be referred to as beta-1-particles. The collector 2016 is an ampere meter, and it may also be referred to as ammeter 2016. Subsequently, the ammeter 2016 transfers a signal to a terminal device 2018. The signal emitted by the ammeter 2016 is a result of the discharging of the charged particles. The intensity of the signal is proportional to the amount of charge contained in the particles. Generally, it will be understood that a higher amount of sample in the liquid in the primary aerosol will give rise to larger particles in the secondary aerosol. Thus, the charge is also a measure for the amount of sample in the liquid.

Shortly summarized, the CAD system 2000 operates by controlling (and, depending on the incoming flow: reducing) the liquid flow rate supplied to the system (e.g., supplied by an HPLC system) by means of a flow control unit 100, which may be realized as a splitter ensemble 100 before supplying the liquid to a CAD droplet generator system 200. The CAD droplet generator system 200 comprises a plurality of component that facilitate the generation of droplets by the application of mechanical ultrasonic waves. Thus, droplets may be generated with a defined frequency. The generated droplets may be released into the drying tube 2008, may be dried to generate particles, and the particles may be transport to a mixing chamber 2010 by a stream of a gas. In the mixing chamber 2010, a surface charge is imparted to the particles by a charger 2010, and high mobility charges are eliminated by an ion trap 2014. Subsequently, the charged particles are measured by an ampere meter 2016, and the measured charge is related to the amount of analyte in the injected sample, and expressed as a chromatographic spectrum 2018.

The CAD system 2000 may allow dispensing the impactor of the CAD system 1000. The CAD system 2000 may allow to generate droplets of adequate size, which is independent from the solvent composition that is used. As discussed, in other systems, an impactor may be employed to remove droplets having a relatively large size. However, in the presently described system, the droplets may be generated with a size distribution, which is independent of the solvent composition. It may thus not be necessary to remove droplets with excessive sizes. Thus, the presently described system 2000 may not comprise an impactor, i.e., it may be impactor-free. Further, by using the flow control unit 100, the liquid flow arriving at the droplet generator, and thus, the amount of liquid flow being guided through the drying tube 2008, may be controlled to be such that all the solvent may be evaporated in the drying tube 2008 (as discussed above). This may render the impactor to remove large droplets superfluous.

Further, as the system 2000 may be impactor free, the system 2000 may also not comprise a drain (such as drain 1009) located downstream of the droplet generator 200 for draining liquid caused by larger droplets. It will be understood that when such a drain is present (as in the system 1000), some portions of the liquid to be drained may be nebulized later, leading to impurities in the later analysis. In other words, when such a drain is present, liquid may accumulate in the spray chamber. Before it is drained out, portions of it may be nebulized and impact subsequent analyses. Such impurities are not present in the presently described system 2000, thus leading to better analysis results.

FIG. 3 depicts a flow control unit 100 for a CAD system 2000, which in the present configuration may also be referred to as a splitter unit 100. Generally, the flow control unit 100 may control a flow of liquid towards the droplet generator 200. More particularly, the flow control unit 100 may be configured to control the liquid flow to the droplet generator 200 so that, independently from the flow arriving at the flow control unit 100, the flow towards the droplet generator is always in a pre-determined range. For example, the flow control unit 100 may transform incoming flow in the range of 25 μl/min to 1600 μl/min to outgoing flows of 25 μl/min to 50 μl/min. In the depicted example, the rest of the flow may go to waste.

In the depicted embodiment, the flow control unit 100 may comprise a splitter, which may be, for example, a tee-shaped splitter, which is conceptually identified by reference numeral 102. The splitter 102 may also be referred to as splitter tee 102 and it may be fed with a liquid flow supplied, for example, by an HPLC system and generally by the inlet 2004. The splitter tee 102 may divert the liquid flow into two different directions. A portion of the liquid may be directed towards one of a plurality of flow resistive elements 106, 108, 110, 112, 114. Another portion of the flow may be directed towards a path comprising an extra volume element 104 and a flow resistive element 116. In other words, the splitter tee 102 may be in fluidic connection with one of a plurality of flow resistive elements 106, 108, 110, 112 and 114. The flow resistive elements 106, 108, 110, 112, 114, and 116 may also be referred to as flow restrictors 106, 108, 110, 112, 114, and 116 and may be realized as restrictor capillaries. Furthermore, the splitter 100 may comprise a dead end, identified with reference numeral 126. The splitter tee 102 may be fluidly connected to any of the flow resistive elements 106, 108, 110, 112, 114 and dead end 126 by means of a flow selection valve 124, which here is realized as a rotatable connecting element 124, which may also be referred to simply as connector 124. The connector 124 may settle down a fluid connection through a plurality of connection ports conceptually identified by reference numeral 1, 2, 3, 4, 5 and 6 corresponding to the flow resistive elements 106, 108, 110, 112, 114 and the dead end 126, respectively.

The connecting ports 1, 2, 3, 4, 5 and 6 may also be referred to as connector 1, 2, 3, 4, 5 and 6, or simply as ports 1, 2, 3, 4, 5 and 6.

In simple words, the liquid flow that crosses over the flow control unit to flow toward the droplet generator 200 is determined by a flow diversion. In simple terms, the diversion of the liquid flow may comprise a series of capillary connections that may be adapted to assume a configuration that permits to establish a fluidic connection between the splitter tee 102 and the flow resistive elements 106, 108, 110, 112 or 114. The fluidic connection may be achieved by a rotatable connecting capillary conceptually identified by reference numeral 124. The liquid flow, and more particularly the flow ratio to the droplet generator 200, may be determined by the flow resistance in the path leading to the droplet generator 200 relative to the flow resistance in the path leading to waste 120.

The selection of a connection port and thus, which of the flow resistive elements 106, 108, 110, 112, 114 is used may permit controlling of the ratio of liquid diverted towards the droplet generator 200. Furthermore, controlling the ratio of liquid flow directed to the droplet generator 200 may allow to establish a predetermined flow range. In other words, the ratio of liquid passing out to the extra volume element 104 and further to the droplet generator 200 may be defined by establishing a fluidic connection with one of the flow resistive elements 106, 108, 110, 112, 114 or dead end 126 through a connection between the connector 124 and any of the port 1, 2, 3, 4, 5 and 6. Each connecting port may serve as an access to one of a plurality of capillary connections, which may permit establishing a fluidic connection between the splitter 102 and a flow resistive element 106, 108, 110, 112, 114 or 126. It will be understood that the flow control mechanism displayed in FIG. 2 is a mere example, and it may be possible to vary the layout of the flow resistive elements. It will also be understood that the number of flow resistive elements may be increased or decreased for different embodiments, i.e. it may be possible to put more or less flow resistive elements.

In one embodiment, the flow resistive elements may have the following dimensions:

| Flow resistive element (reference numeral) | Length (mm) | Inner diameter (μm) |
|---|---|---|
| 116 | 300 | 30 |
| 106 | 300 | 30 |
| 108 | 400 | 40 |
| 110 | 500 | 50 |
| 112 | 750 | 75 |
| 114 | 1000 | 100 |

Moreover, the fraction of the liquid directed to any of the flow resistive elements 106, 108, 110, 112 or 114 may later on pass out to a waste container 120, which also be referred to as waste collector 120, or simply as waste 120. In one embodiment, the fraction of liquid directed to any of the flow resistive elements 106, 108, 110, 112 or 114 may also be collected for further isolation or purification. In other words, in one embodiment of the present invention, the waste collector 120 may also function as a sample collector 120. In a further embodiment of the present invention, the waste collector 120 may be replaced by any other type of connection permitting transferring the collected liquid to another detector or part of an HPLC system.

As discussed, the T-splitter 102 may also be connected to a dead end 126. That is, when the connector 124 is connected to the dead end 126, (nearly) the total amount of liquid fed to the splitter 102 is directed towards the droplet generator 200. In this case, there is no liquid passing to the waste collector 120, i.e. the vast portion of the liquid fed to the splitter 100 passes through the splitter tee 102 and towards the droplet generator 200.

Further, if the rotatable connector 124 establishes a fluidic connection with, for example, the port 2, part of the liquid fed to the splitter 100 may be diverted to the flow resistive element 106. In one embodiment, the flow resistive element 116 may have the same dimensions as flow resistive element 106, which may permit to have substantially the same flow of liquid towards the droplet generator 200 and towards the waste 120. However, if the rotatable connector 124 establishes a fluid connection with the port 3, now the portion of diverted liquid may be directed to the flow resistive element 108, which may have dimensions different from the column 116, therefore, a different ratio of the liquid flow may be diverted to the waste 120. In simple terms, a diverse set of deflected effluent ratios may be achieved through coupling the rotatable connector 124 to different connection ports. In more simple words, establishing a fluidic connection with the flow resistive elements 106, 108, 110, 112, 114 or to the dead end 126 may function as a tuning system for controlling the flow rate of liquid passing towards the droplet generator 200.

It may thus also be possible to estimate the flow ratio between the liquid supplied towards the droplet generator 200 and towards the waste 120. Assuming that the flow resistance in the paths is mostly caused by the flow resistive elements 116, and 106, 108, 110, 112 and 114, respectively, and assuming that the flow resistive elements generally have the same design (except for their dimensions), e.g., they are formed from the same material, it will be understood that their flow resistance has the following dependency:

$$R \sim l/D^4$$

where the following notation is used

R: flow resistance of flow resistive element;
l: length of flow resistive element;
D: diameter of flow resistive element.

That is, the resistance is proportional to the length of the flow resistive element and inversely proportional to the fourth power of the diameter.

Under the above assumptions and using the notation $R_{116}$ for the flow resistance of the flow resistive element 116 and $R_n$ for the flow resistance of the flow resistive element in the path towards the waste container 120, the ratio of fluid flow towards the droplet generator 200 can be expressed as $$\text{ratio} = \frac{1/R_{116}}{1/R_{116} + 1/R_n}$$

In one embodiment, the following dimensions may be used for the flow resistive elements, wherein the flow resistive element 116 has a length of 300 mm and a diameter of 30 μm.

| Flow restriction element (n) | Length (mm) | Inner diameter (μm) | Relative flow resistance (AU) | Flow ratio towards 200 | Split ratio |
|---|---|---|---|---|---|
| 116 | 300 | 30 | 1 | — | |
| 106 | 300 | 30 | 1.000 | 0.500 | 2.00 |

-continued

| Flow restriction element (n) | Length (mm) | Inner diameter (μm) | Relative flow resistance (AU) | Flow ratio towards 200 | Split ratio |
|---|---|---|---|---|---|
| 108 | 400 | 40 | 0.423 | 0.297 | 3.37 |
| 110 | 500 | 50 | 0.216 | 0.177 | 5.63 |
| 112 | 750 | 75 | 0.064 | 0.060 | 16.63 |
| 114 | 1000 | 100 | 0.027 | 0.026 | 38.04 |
| 126 |  |  | ∞ | 1 | 1.00 |

Generally, it will be understood that if the flow resistance in the path towards the droplet generator 200 is set (by a given flow resistive element 116 in this path), the lower the flow resistance in the other path towards the waste 120, the more fluid is directed towards the waste 120. Thus, the lower the resistance of the flow resistance element n in the path towards the waste 120, the less fluid will be directed towards the droplet generator 200. Further, it will be understood that when connector 124 is connected to a dead end 126, this corresponds to an infinite flow resistance, such that the complete flow would be directed towards the droplet generator 200.

The above discussed examples allow the ratio of flow directed towards the droplet generator 200 to be between 1/1 (i.e., 100%) and 1/38. However, it will be understood that by choosing different dimensions of the flow resistive elements, other ratios may also be realized.

Further considerations relating to the flow resistive elements, which may also be referred to as flow resistors, will be discussed below.

Assuming a laminar flow and further assuming that the flow resistance is exclusive caused by the flow resistive elements, according to the Hagen-Poiseuille equation, the pressure drop in the paths towards the droplet generator 200 (which will be referred as path 1) and towards the waste 120 (which will be referred as path 2), the following equations apply:

$$\Delta P_1 = \dot{V}_1 \cdot \frac{l_1}{R_1^4} \cdot \frac{8\eta}{\pi} \quad (A)$$

$$\Delta P_2 = \dot{V}_2 \cdot \frac{l_2}{R_2^4} \cdot \frac{8\eta}{\pi} \quad (B)$$

where:
i is the path (1 or 2),
$\Delta P_i$ is the pressure drop in path i;
$\dot{V}_i$ is the volume flow in path i;
$l_i$ is the length of restrictor in path i;
$R_i$ is the radius of the restrictor in path i;
$\eta$ is the viscosity of the fluid.

The following requirements apply:

$$\Delta P_1 = \Delta P_2 \quad \text{I:}$$

$$\dot{V}_2 = N \cdot \dot{V}_1 \quad \text{II:}$$

$$t_2 = t_1 \quad \text{III:}$$

where
N: is the ratio of fluid flow in path 2 vs. path 1;
$t_i$: is the time delay in path i.

In other words, according to (I), the pressure drop in the paths is (approximately) equal; (II) denotes the ratio of fluid flow in path 2 vs. path 1; and according to (III), the time the fluid needs to travel through the restrictors should be equal.

The time delay $t_i$ in path i can be derived as follows:

$$t_i = \frac{V_i}{\dot{V}_i} = \frac{\pi \cdot R_i^2 \cdot l_i}{\dot{V}_i}$$

where $V_i$ is the volume of flow restrictor i.
Applying requirement (I) results in $$\Delta P_1 = \Delta P_2$$

$$\Rightarrow \dot{V}_1 \cdot \frac{l_1}{R_1^4} \cdot \frac{8\eta}{\pi} = \dot{V}_2 \cdot \frac{l_2}{R_2^4} \cdot \frac{8\eta}{\pi}$$

$$\Rightarrow \dot{V}_1 \cdot \frac{l_1}{R_1^4} = \dot{V}_2 \cdot \frac{l_2}{R_2^4}$$

Using requirement II: $\dot{V}_2 = N \cdot \dot{V}_1$ results in $$\Rightarrow \dot{V}_1 \cdot \frac{l_1}{R_1^4} = N \cdot \dot{V}_1 \cdot \frac{l_2}{R_2^4}$$

$$\Rightarrow \frac{l_1}{R_1^4} = N \cdot \frac{l_2}{R_2^4}$$

$$\Rightarrow l_2 = l_1 \frac{R_2^4}{N \cdot R_1^4}$$

Further, applying the requirement III: $t_2 = t_1$, results in $$\frac{\pi \cdot R_1^2 \cdot l_1}{\dot{V}_1} = \frac{\pi \cdot R_2^2 \cdot l_2}{\dot{V}_2}$$

Applying requirement II: $\dot{V}_2 = N \cdot \dot{V}_1$ in this equation results in $$\frac{\pi \cdot R_1^2 \cdot l_1}{\dot{V}_1} = \frac{\pi \cdot R_2^2 \cdot l_2}{N \cdot \dot{V}_1}$$

$$\Rightarrow R_2^2 = R_1^2 \cdot N \cdot \frac{l_1}{l_2}$$

Applying the above found equation for $l_2$ into this equation results in $$R_2^2 = R_1^2 \cdot N \cdot \frac{l_1 \cdot N \cdot R_1^4}{l_1 \cdot R_2^4}$$

$$\Rightarrow R_2^6 = N^2 \cdot R_1^6$$

$$\Rightarrow R_2 = N^{1/3} \cdot R_1$$

Again applying the above found equation for $l_2$ further results in $$l_2 = l_1 \cdot \frac{R_2^4}{N \cdot R_1^4} = l_1 \cdot \frac{N^{4/3} \cdot R_1^4}{N \cdot R_1^4} = N^{1/3} \cdot l_1$$

Now consider the case of N=8, i.e., 8 times as many liquid flows through path 2 as compared to path 1. In such a case, the following equations would apply $$l_2 = 2 \cdot l_1$$

$$R_2 = 2 \cdot R_1$$

$$V_2 = 8 \cdot V_1$$

$$\dot{V}_2 = 8 \cdot \dot{V}_1$$

$$t_2 = t_1$$

In other words, the above equations can also be expressed as $$N = (l_2/l_1)^3 \text{ and}$$

$$N = (R_2/R_1)^3$$

That is, when wanting to meet the above-mentioned requirement (I) to (III), i.e., same pressure drops in the paths, the volume flow according to equation (II), and the same delay time, the relative length of the flow restrictors and the relative inner radii of the flow restrictors should scale proportionally. This is also realized in the discussed embodiment (see the lengths and the inner diameters in the above table).

Having the same delay times in the different paths may be advantageous. It should be understood that this denotes that liquid that is divided at the splitter T 102 will thus have passed the restrictor 116 in the path towards the droplet generator 200 simultaneously with liquid having passed the restrictor in the path towards the waste 120. This is particularly advantageous when considering changing the composition of the liquid (e.g., when liquid gradients are used in HPLC). If they would not have the same delay times in the paths, this would lead to the restrictors being filled with differing solvent compositions, which would lead to different flow resistances, which may be undesirable, as it may impact the functioning of the above described mechanisms.

Again with reference to FIG. 3, further details of the different configurations (i.e., the flow selection valve 124 assuming different states) are also summarized in the below table.

droplet generator 200 and towards the waste 120, when the solvent is water and has a viscosity η=1 mPa·s.

By using these pressure drops, one can arrive at the flow in the individual paths by using the above equations (A) and (B), and at the total flow by adding up the flows in the individual paths.

Column 4 in the above table refers to the split ratio, i.e., the inverse of this split ratio is the ratio of fluid that is guided into the path towards the droplet generator 200.

Columns 5 and 6 denote total minimum and maximum flows for which the respective setting of the valve 124 should be used. Column 7 denotes the ratio between these maximum and minimum flows. Columns 8 and 9 then denote the corresponding minimum and maximum flows that arrive at the droplet generator 200. That is, the minimum (maximum) flow at the droplet generator 200 can be calculated as the minimum (maximum) incoming flow divided by the split ratio.

The last two columns, i.e., columns 10 and 11, denote the pressure loss across the restrictors 116 and 106 to 114, i.e., $\Delta P_1$ and $\Delta P_2$, when considering the minimum and maximum flow (see columns 5 and 6), when the solvent is water and has a viscosity η=1 mPa·s.

It will be understood that the flow arriving at the droplet generator is the total flow divided by the split ratio (see column 4).

For example, the valve setting 3 corresponds to the restrictor 116 in the flow path towards the droplet generator 200 having a diameter of 30 μm and a length of 300 mm, and the restrictor towards the waste being restrictor 108 with a diameter of 40 μm and a length of 400 mm. The split ratio (see column 4) is 3.37, i.e., 1/3.37 of the total flow will be guided towards the droplet generator 200. When supplying a total incoming flow of 103 μl/min (see column 5), the flow towards the droplet generator 200 will be 30.56 μl/min (see column 8) and the pressure drop will be 77 bar (see column 10). Correspondingly, at a total incoming flow of 173 μl/min (column 6) the flow towards the droplet generator 200 will be 51.33 μl/min (column 9) and the pressure drop will be 129 (column 11).

It will thus be understood that the presently described flow control unit 100 is adapted to control an incoming flow

| Col. 1 Valve setting | Col. 2 Diameters of restrictors μm | Col. 3 Total flow at 100 bar μl/min | Col. 4 Split ratio | Col. 5 Min. flow μl/min | Col. 6 Max. flow μl/min | Col. 7 Max/Min | Col. 8 Min flow to DG μl/min | Col. 9 Max flow to DG μl/min | Col. 10 Min. pressure bar | Col. 11 Max. pressure bar |
|---|---|---|---|---|---|---|---|---|---|---|
| 1 | 30/0 | 40 | 1 | 25 | 56 | 2.25 | 25.00 | 56.00 | 63 | 141 |
| 2 | 30/30 | 80 | 2.00 | 56 | 103 | 1.84 | 28.00 | 51.50 | 71 | 130 |
| 3 | 30/40 | 134 | 3.37 | 103 | 173 | 1.68 | 30.56 | 51.33 | 77 | 129 |
| 4 | 30/50 | 224 | 5.63 | 173 | 385 | 2.22 | 30.73 | 68.39 | 77 | 172 |
| 5 | 30/75 | 661 | 16.63 | 385 | 1000 | 2.60 | 23.16 | 60.15 | 58 | 151 |
| 6 | 30/100 | 1512 | 38.04 | 1000 | 2500 | 2.50 | 26.29 | 65.73 | 66 | 165 |

In the above table, the first column relates to the setting of the valve 124 in FIG. 3. The second column denotes the diameters of the flow restrictors 116 in the flow path towards the droplet generator 200 and of the flow restrictors 106 to 114 in the flow path towards the waste 120. The flow restrictors 116 and 106 to 114 have the lengths at outlined above.

The third column denotes, for a pressure drop across the restrictors (i.e., $\Delta P_1$ and $\Delta P_2$ in the above notation), the total flow through the system, i.e., the total flow towards the in the range of 25 μl/min to 2500 μl/min so that the flow towards the droplet generator 200 is in the range of 23 μl/min to 68 μl/min, while operating at pressure drop levels in the range of 58 bar and 165 bar.

The above-mentioned pressure levels may also be advantageous for the following reason. Depending on the type of the droplet generator 200, the droplet generator 200 may advantageously operate with incoming liquid having a certain pressure, i.e., few (such as 1 to 5) bar above atmospheric pressure. It may be advantageous that this pressure is substantially lower than the pressure drop across the restrictors 116 and 106 to 144, so that the pressure required for optimal operation of the droplet generator does not have a substantial impact and can be neglected in the above considerations.

Furthermore, in the above, valve setting 1 has been explained to be connected to a dead end. However, in some embodiments, also this setting allows liquid in the restrictor path to go towards the waste. This can be realized, e.g., by having a flow restrictor with a very high flow resistance, e.g., a flow restrictor with a very small inner diameter. This may have the advantage that no liquid may "bleed" out of the dead end path.

Again with reference to FIG. 3, the path towards the droplet generator 200 may also comprise an extra volume element 104, which may also be referred to as a volume-adding element 104, which may add a certain volume to the flow path to the droplet generator 200. It will be understood that the flow selection valve 124 may add volume to the flow path towards the waste 120. The extra volume element 104 may add the same amount of volume to the flow path towards the droplet generator 200. This ensures, e.g., when the flow selection valve 124 assumes configuration 2 (i.e., connects to flow restrictor 106) and when a gradient of solvents is used, that the same composition of the solvent arrives simultaneously at the flow restrictor 116 in the path towards the droplet generator 200 and at the flow restrictor 106 to 114 in the path towards the waste 120. This is advantageous, as otherwise, composition of solvents at the flow restrictors could be different, which (when the solvents have different viscosities) would lead to different pressure drops at the flow restrictors in the path towards the droplet generator 200 and in the path towards the waste 120.

That is, in summary, embodiments of the present invention allow to control the flow of liquid to the droplet generator 200, such that only a liquid flow in a predetermined range arrives at the droplet generator. Thus, embodiments of the present invention allow to tune the flow ratio of liquid passing to the droplet generator 200. As discussed, the flow resistive elements 106, 108, 110, 112 and 114 may have different dimensions, which may also permit systematically increasing or decreasing the flow ratio arriving at the droplet generator 200. Moreover, the ability of the flow control unit 100 of adjusting the flow arriving to droplet generator 200 through a diverse set of combination for establishing a fluidic connection between a splitter 102 and a plurality of flow resistive elements 106, 108, 110, 112, 114 and 126, may also be advantageous to deal with the liquid variations typically observed in HPLCS systems, i.e. the flow control unit 100 may have a configuration that may allow to adopt a configuration that can tackle with flows frequently used in HPLC systems.

Shortly summarized, the fluidic connection established between the splitter tee 102 fed with an liquid by an HPLC, and with a flow resistive element 106, 108, 110, 112 and 114 may allow controlling the ratio of liquid flow diverted to the droplet generator 200, and consequently, it may possible to control the liquid flow rate fed to the droplet generator 200. For instance, the flow rate of a liquid supplied by an HPLC system, with flows of up to 2500 µL/min, may be reduced to a flow rate in the range of 25 to 56 µL/min, which may then be fed to a CAD droplets generator 200, for breaking the liquid flow down into drops of an identical size (e.g., a size independent of the solvent used). It will be understood that in such systems, only approximately 1% to 2% of the overall flow should be directed to the droplet generator 200. To achieve this, a flow resistive element in the path towards the waste 120 would have a flow resistance that is approximately 50 to 100 times lower than the flow resistance of the flow resistive element 116 in the paths to the droplet generator 200.

Generally, the flow rate reduction may be achieved independently from the liquid type. The liquid flow rate reaching the CAD droplets generator 200 may contribute to better control over the droplets size generated by nebulization of the liquid.

In more simple words, the flow control ensemble 100 may provide a solution to the objective by means of reducing the quantity of liquid from the column. More particularly, a solvent independent splitter may be used to control the flow of liquid towards the droplet generator. Thus, a flow control may be established without using an impactor. The reduced quantity of liquid can then be evaporated completely in the transport flow. This part of the liquid is then transferred into drops of a constant size, i.e. a size independent of the solvent or of a constant size distribution. Thus, the solvent dependence has been eliminated. This in turn permits elimination of the non-linearity via calculation, as now one signal is clearly assigned to one quantity of analyte. Thus, both problems present in prior systems may be eliminated.

FIG. 4 depicts a droplet generator 200 for a CAD system 2000 according to embodiments of the present invention. In particular, the droplet generator 200 may generate the droplets with defined frequency. In some embodiments, this frequency may be adjustable. For example, the droplet generator 200 may be a vibrating orifice droplet generator 200. In some embodiments, the system may also comprise an amplitude control for the droplet generator to control the amplitudes of the vibrations.

In simple terms, the droplet generator 200 comprises a generator 202, an amplifier 204, a piezoelectric ceramic 206, an incoming pipe 208, a gas flow conduit 216, a housing 210 with an orifice 211, and an initial droplet flow region 218, which may also be referred to as a low wind tube 218.

In simple words, one embodiment of the present invention relates to the nebulization or aerosol formation of a liquid flow 226, which may be possible to obtain by flowing a liquid stream 226, generating a jet 228 and forming droplets 224 from that jet 228. It will be understood that the liquid flow 226 typically arrives from flow control unit 100 to the droplet generator 200.

The droplet generator 200 (and generally the system 2000) may be designed so that droplets 224 are created having a size which is mostly independent of the type of the liquid arriving at the droplet generator 200 and independent of the liquid flow arriving at the droplet generator 200.

The liquid flow 226 arriving at the droplet generator 200 is first transformed to a jet 228 of liquid, which subsequently decomposes to droplets 224 (also see 223 depicting a droplet which is about to separate from the liquid jet 228). To form the jet 228, the liquid is guided through the orifice 211 having an orifice diameter. Exemplary orifice diameters may be in the range of 1 µm to 50 µm, preferably 3 µm to 40 µm, further preferably 5 µm to 20 µm, such as 10 µm.

Typically, a diffusion charging process may later be used to charge the particles (generated by drying the droplets 224). In such a diffusion charging process, the charge deposited on a particle is proportional to its diameter. It will thus be understood that creating many small droplets (and thus many small particles) gives rise to a higher signal, thus rendering the present technology more sensitive. This makes small diameters of the orifice 211 desirable.

However, small diameters of the orifice 211 may render the orifice 211 more prone to breakage or clogging. Further, the smaller the diameter of the orifice 211, the more pressure is needed to generate the jet 228, imparting the functioning of the above discussed flow control unit 100 (as for the above rationales, it was assumed that the pressure drop across the flow control unit 100 is substantially larger than the pressure drop at the droplet generator 200).

The above-mentioned dimensions of the orifice 211 are suitable to establish a compromise between the observations made in the above two paragraphs.

As discussed, the droplet generator 200 generates a jet 228, which subsequently breaks down into individual droplets 224.

There may be disturbances in the jet 228. The most rapidly growing disturbance has a wavelength $\lambda=9.02 \cdot r$, where r is the radius of the jet 228, which is half the diameter of the orifice 211—see, e.g., Kowalewski, Fluid Dynamics Research 17 (1996), 121-145, "On the separation of droplets from a liquid jet".

If this disturbance causes the droplets 224 to form, the diameter of the droplets 224 can be calculated as follows:

The volume of the droplets corresponds to the volume of a section of the jet 228 having a length corresponding to the wavelength $\lambda$, i.e., $$V_{droplet} = \lambda \cdot \pi \cdot \left(\frac{D}{2}\right)^2 = 9.02 \cdot \pi \cdot \frac{1}{8} \cdot D^3,$$

where D is the diameter of the jet 228, corresponding to the diameter of the orifice. Thus, by using $$V_{droplet} = \frac{4}{3} \cdot \pi \cdot \left(\frac{D_{droplet}}{2}\right)^3,$$

one arrives at $$D_{droplet} = \sqrt[3]{\frac{3}{4} \cdot 9.02} \cdot D = 1.89 \cdot D.$$

That is, the droplet diameter $D_{droplet}$ caused by the fastest growing perturbation is approximately 1.9 times the diameter D of the jet 228 and of the orifice 211. For example, for an orifice having a diameter of 10 μm, these droplets would be 19 μm in diameter.

However, it should be understood that the above described model of the fastest growing disturbance having a wavelength $\lambda=9.02 \cdot r$ is simplified and that the fastest growing wavelength may actually depend on the solvent used. However, when generating an external disturbance with a certain frequency (corresponding to a wavelength in the jet) and sufficient amplitude, this disturbance will lead to drop formation even if it is not the wavelength that would actually grow the fastest. This makes it possible to transform different liquids into droplets of the same size if the external disturbance is always impressed at the same frequency.

In embodiments of the present technology, the generator 202 may be operated to cause a perturbation in the jet 228 that is equal to (or at least close) to the above discussed fastest growing perturbation. The frequency causing this perturbation can be calculated as $$f=F/V_{droplet}$$

where f is the frequency, F is the flow towards the droplet generator 200, and $V_{droplet}$ is the volume of the droplet.

It will be understood that when knowing the total flow to the system 2000, and the details of the setting of the flow control unit 100, the flow towards the droplet generator 200 can be determined, and thus, the excitation frequency f can be set correspondingly.

When exciting the droplet generator 200 with a frequency at (or close) to the excitation frequency corresponding to the fastest growing disturbances, the droplets 224 will form in a very controlled and uniform manner, which is also independent on the liquid.

For instance, a generator 202 may be configured to generate a voltage that may be amplified by an amplifier 204. The signal emitted by the generator 202 may be adjustable to support perturbations as discussed above. In simple words, droplets 224 may be formed with a defined size (or size distribution) depending on a chosen frequency. In even more simple words, a signal (e.g., a sinus signal) may be used to disintegrate the liquid flow 226 into drops 224 (by supporting a perturbation at or close to the fastest growing perturbation) and release them into a surrounding containing a specific carrier, which may make feasible the formation of droplets 224 suspended in, for example, an inert gas. The resultant suspension may also be referred to as an aerosol, a suspension mist, a spray or nebulized liquid. As discussed, this aerosol may also be referred to as the primary aerosol.

In one embodiment, the signal may be amplified by an amplifier 204, which is in charge of amplifying the signal before feeding it to the piezoelectric ceramic 206, which may be allocated around a housing 210 with orifice 211. Such a signal may allow the generation of droplets 224 of relative homogenized size distribution. In simple terms, feeding of the system with a vibration energy source may support the fastest growing disturbances and thus cause fragmentation (with a certain droplet size or droplet size distribution) of the liquid flow into droplets 224. Thus, relatively small and stable droplets 224 with a relatively narrow size distribution (as outlined above) may be generated.

In the presently described embodiment, the droplet generator 200 is realized as a piezo-electric droplet generator comprising a piezoelectric ceramic 206. However, it should be understood that any droplet generator that is configured to cause a perturbation at the jet 228 with an adjustable or controllable frequency can be used. More particularly, the perturbation may also be transmitted mechanically to the jet 228, pneumatically, magnetically, magnetostrictively, electromechanically, and/or electrodynamically. As discussed above with reference to the second table, in the presently described embodiment, the flow arriving at the droplet generator 200 may be in a range of 23 μl/min and 68 μm/min. It may be desirable that the droplet generator 200 generates droplets with the same sizes (i.e., with the same size distribution) for these flows. Following the above discussed rationales, the frequency of the generator 202 may thus ideally be adjustable in a range, where the largest value is at least 3 times larger than the smallest value.

In the presently depicted embodiment, the piezoelectric ceramic 206 may comprise materials, such as, for example, perovskites structures and other related structures exhibiting piezoelectric properties such as, for example, but not limited to, barium titanate, lead zicornate titanate, potassium niobate, zinc oxides with Wurtzite structure and sodium tungstate. This is merely exemplary and other materials may also be used. The piezoelectric ceramic 206 may also be referred to as piezoelectric 206 or simply as ceramic 206, which may function as a receptor of electrical oscillations. In other words, the ceramic 206 may perform as a piezoelectric element able to receive electrical signals (e.g., a sinus shaped signal) to subsequently produce and apply directional force to an opposing body, e.g. the wall of the housing 210.

For instance, in one embodiment, the ceramic 206 may be allocated around the wall of a housing 210. This configuration may allow the ceramic 206 to transfer the oscillations to the housing 210 to produce a number of droplets 224

In one embodiment of the present invention, the housing 210 with the orifice 211 may be replaceable. Thus, it may be possible to choose orifices 214 of diverse diameters as outlined above. Such a diameter selection may permit, contribute to, or at least facilitate, a droplet size control.

In other words, selecting the frequency of the oscillation supplied to the ceramics 206 may allow tuning generating droplets of the same size or of the same size distribution independent of the incoming flow. As outlined above, the frequency may be proportional to the flow arriving at the droplet generator 200. Such a combination may thus permit generating droplets 224 with a given size regardless of the solvent. That is, by controlling the flow towards the droplet generator and by setting the frequency of the oscillations of the droplet generator according to this flow towards the droplet generator, the distribution of droplet sizes generated may be independent from the incoming flow and from the solvent used.

Notably, the above given rationales of the droplet formation are independent of the liquid and the solvent used. That is, with the presently described technology, which may include controlling the flow of liquid towards the droplet generator 200, and setting the operation frequency f of the droplet generator 200 depending on the flow of liquid towards the droplet generator 200, it may be possible to generate droplets 224 with a certain size or a certain size distribution, which is relatively independent of the type of the solvent. Thus, it may be possible to generate droplets 224 with a certain size (or size distribution) which is (mostly) independent of the liquid/solvent and the flow.

The droplets 224 expelled from the housing 210 may be transported by a gas flow supplied by a gas conduit 216, which may also simply be referred to as conduit 216. The gas conduit 216 may be designed to adapt a configuration that may allow controlling the gas flow supplied to the CAD droplet generator 200, e.g. it may be possible to supply a gas flow rate with a range of 0.1 l/min to 10 l/min, for example, a flow of 3 l/min. The conduit 216 may feed gas streams of, for example, nitrogen, helium, or air, though it is noted that this is merely exemplary and other gases may also be used. The fed stream may carry the droplets 224 towards a longitudinal low wind region, conceptually identified by reference numeral 218. The low wind region 218 may have an inner diameter 220 substantially larger than the diameter of the orifice 211. It will be understood that in the present embodiment, the jet of liquid 228 will be fed to the low wind region 218 with a flow in the range of approximately 20 μl/min to 70 μl/min. With an orifice diameter of 10 μm, this corresponds to a flow velocity of several m/s. The gas supplied for the drying tube may typically be supplied with a flow velocity of several l/min, being approximately a factor of $10^5$ higher than the liquid flow. It may be advantageous that the flow velocity of the gas flow roughly corresponds to the flow velocity of the liquid stream 228, as otherwise, the droplets 224 may form in an uncontrolled manner and not allow the above described control of their size. Thus, the diameter of the low wind region may be substantially greater than the diameter of the orifice 211. For example, a quotient of the diameter of the low wind region vs. the diameter of the orifice may be in the range of 30 to 10000, preferably 50 to 2000, such as 100 to 1000. Exemplary diameters of the low wind tube may be 1 mm to 10 mm, such as 2 mm to 4 mm, for example 3 mm. Within the low wind region 218, the droplets 224 expelled by the housing 208 through the nozzle 212 and carried by a gas supplied by the conduit 216 may stabilize and acquire a constant velocity before entering a drying tube 2008. In other words, within the section 218, the velocity of the gas and the droplets 224 may be similar, i.e. the velocity of the gas and the liquid phase may become relatively small, which may permit a more undisturbed breakup into droplets.

In simple words, a generator 202 produces a signal that is supplied to an amplifier 204 in charge of feeding oscillations to a piezoelectric ceramic 206. Afterwards, the ceramic 206 emits mechanical ultrasonic waves, which are passed to a housing 210 through walls. A liquid flow 226 fed to the housing 210 may be affected by the waves to thus produce a stream of droplets 224 from a jet 228. The expelled droplets 224 may be subsequently carried out, by means an inert gas stream supplied through a gas conduit 216, towards a low wind region 218 where the droplets 224 and the gas stream may reach velocity equilibrium. Subsequently, the droplets 224 may continue to a drying tube 2008, where the droplets 224 may be dried out, i.e. the solvent may be eliminated, to thus generate particles, that are transferred to further elements of the CAD system. The approach of the CAD generator 200 may offer a droplet generation means, which may lead to the production of droplets 224, and consequently particles, with a narrow size distribution.

In more simple words, the flow reduced by the flow control 100 may be transferred to the CAD drop generator 200 into a liquid jet, which is then decomposed into drops of identical size. Since this method for generating drops may show a minor dependence of the drop size on the physical properties of the liquid (and thus the solvent), an embodiment of the present invention deals with the issue, precisely, by enforcing one drop size by means of acoustic excitation. This approach may reduce the minor dependence of the drop size on the physical properties of the solvent almost to zero.

Moreover, since the acoustic excitation is effected by means of a piezoelectric ceramic 206, the frequency of excitation may be readjusted to a known liquid flow, so that the drops may always have the same size even in case of different flows of the liquid. In other words, in embodiments of the present invention, the droplet generation unit 200 may comprise a frequency control element that controls the frequency of the voltage source 202 in dependence of the flow of liquid fed to the droplet generation unit 200. The property of the detection limit of this method not depending on the measuring technique but on the quality of the solvent used is maintained.

The consistency of the distribution of the drop size may be lost in the drying tube 2008 as highly charged drops undergo Coulomb explosions in the drying tube 2008. That is, the droplet generator 200 may also generate charged droplets 224. When such charged droplets 224 are increasingly dried in the drying tube 2008, the charge to volume ratio may successively increase up to a point where they underdo Coulomb explosions, which may generate droplets with an uncontrolled size. This may be avoided by application of a bipolar corona discharge downstream of the drop generator 200 and upstream of the drying tube 2008.

That is, in general words, embodiments of the present invention employ a droplet generation unit 200 leading to a very narrow size distribution of the generated droplets and/or a flow control element 100 disposed upstream of the droplet generation unit 200 resulting in a defined and evaporable flow of liquid to the droplet generation unit 200.

More particularly, embodiments of the present technology may allow different solvents to give rise to identical (or at least similar) droplet sizes, or droplet size distributions. For example, the (volume based) average droplet size for water may be referred to the average water droplet size. Correspondingly, one may define the average methanol droplet size, and the average acetonitrile droplet size. In embodiments of the present technology, the average methanol droplet size and the average acetonitrile droplet size may be within a range of [average water droplet size×0.5, average water droplet size×1.5], preferably within a range of [average water droplet size×0.8, average water droplet size×1.2], such as within a range of [average water droplet size×0.9, average water droplet size×1.1]. The present technology may allow generation of such droplet sizes for the different solvents.

While in the above, a preferred embodiment has been described with reference to the accompanying drawings, the skilled person will understand that this embodiment was provided for illustrative purpose only and should by no means be construed to limit the scope of the present invention, which is defined by the claims.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

What is claimed is:

1. A detector system comprising:
   a droplet generator system, wherein the droplet generator system comprises:
   a droplet generator unit, wherein the droplet generator unit is configured to create droplets from a liquid supplied to the droplet generator unit with a droplet generator liquid flow,
   wherein the droplet generator unit is further configured to create the droplets with a droplet generation frequency,
   wherein the droplet generator system further comprises:
   a controller configured to control the droplet generator unit, wherein the controller is also configured to control the droplet generation frequency,
   wherein the droplet generation frequency is adjustable and wherein the controller is configured to control the droplet generation frequency proportionally to the droplet generator liquid flow,
   a flow control unit upstream of the droplet generator unit, wherein the flow control unit comprises a splitter element;
   wherein the splitter element is configured and located to split the incoming liquid flow into an outgoing flow path towards the droplet generator unit and into an additional flow path.

2. The detector system according to claim 1, wherein the droplet generator unit is configured to generate disturbances and to transmit the disturbances to the droplet generator liquid flow,
   wherein the droplet generation frequency corresponds to a frequency of the disturbances.

3. The detector system according to claim 1, wherein the droplet generator unit comprises an orifice, and
   wherein the droplet generator unit is configured to generate a liquid jet by the droplet generator liquid flow being guided through the orifice,
   wherein the orifice has an orifice diameter,
   wherein, for each droplet generator liquid flow in a droplet generator flow range having a lower limit and an upper limit, the upper limit being at least 2 times the lower limit,
   the controller is configured to control the droplet generation frequency to be within a range defined by $0.5 \cdot v$ and $1.5 \cdot v$, wherein $v = 0.28 \cdot F/D^3$, wherein D is the orifice diameter and F is the droplet generator liquid flow to the droplet generator.

4. The detector system according to claim 1, wherein the droplet generator system further comprises a flow control unit upstream of the droplet generator unit.

5. The detector system according to claim 4,
   wherein for each incoming liquid flow in an incoming flow range, the flow control unit is configured to direct the droplet generator liquid flow in an outgoing flow range towards the droplet generator unit,
   wherein the incoming flow range has an incoming lower limit and an incoming upper limit, wherein the incoming upper limit is at least 10 times the incoming lower limit,
   wherein the outgoing flow range has an outgoing lower limit and an outgoing upper limit, wherein the outgoing upper limit is at most 5 times the outgoing lower limit.

6. The detector system according to claim 4, wherein the detector system is a charged aerosol detector system.

7. An analytical method using a detector system, the detector system comprising:
   a droplet generator system, wherein the droplet generator system comprises:
   a droplet generator unit, wherein the droplet generator unit is configured to create droplets from a liquid supplied to the droplet generator unit with a droplet generator liquid flow,
   wherein the droplet generator unit is further configured to create the droplets with a droplet generation frequency, the method comprising:
   creating the droplets with the droplet generation frequency,
   wherein the droplet generator system further comprises a controller configured to control the droplet generator unit, wherein the controller is also configured to control the droplet generation frequency, wherein the droplet generator system further comprises
a flow control unit upstream of the droplet generation unit, wherein the flow control unit comprises a splitter element, wherein the splitter element is configured and located to split the incoming liquid flow into an outgoing flow path towards the droplet generator unit and into an additional flow path, wherein the method further comprises
adjusting the droplet generation frequency,
the controller controlling the droplet generator unit,
the controller controlling the droplet generation frequency, and
the controller controlling the droplet generation frequency proportionally to the droplet generator liquid flow.

8. The analytical method according to claim 7 further comprises:
generating disturbances with the droplet generator unit;
transmitting the disturbances to the droplet generator liquid flow, wherein the droplet generation frequency corresponds to a frequency of the disturbances; and
controlling the droplet generation frequency to be within a range defined by $0.5 \cdot v$ and $1.5 \cdot v$, wherein $v=0.28 \cdot F/D^3$, wherein D is the orifice diameter and F is the droplet generator liquid flow to the droplet generator.

9. The analytical method according to claim 8 further comprises:
controlling the droplet generation frequency to be within the range defined by $0.8 \cdot v$ and $1.2 \cdot v$.

10. The analytical method according to claim 8 further comprises:
controlling the droplet generation frequency to be within the range defined by $0.9 \cdot v$ and $1.1 \cdot v$.

* * * * *